(12) United States Patent
Lee et al.

(10) Patent No.: US 9,998,449 B2
(45) Date of Patent: Jun. 12, 2018

(54) ON-DEMAND SERVING NETWORK AUTHENTICATION

(71) Applicant: QUALCOMM Incorporated, San Diego, CA (US)

(72) Inventors: Soo Bum Lee, San Diego, CA (US); Gavin Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 14/675,676

(22) Filed: Mar. 31, 2015

(65) Prior Publication Data

US 2016/0094542 A1  Mar. 31, 2016

Related U.S. Application Data

(60) Provisional application No. 62/056,387, filed on Sep. 26, 2014.

(51) Int. Cl.
*H04L 29/06* (2006.01)
*H04W 12/04* (2009.01)
(Continued)

(52) U.S. Cl.
CPC .......... *H04L 63/0823* (2013.01); *H04L 63/06* (2013.01); *H04L 63/0853* (2013.01);
(Continued)

(58) Field of Classification Search
CPC . H04L 63/0823; H04L 63/06; H04L 63/0853; H04L 63/0869; H04W 12/04;
(Continued)

(56) References Cited

U.S. PATENT DOCUMENTS 8,505,076 B2  8/2013  Das et al.
8,627,092 B2  1/2014  Fischer et al.
(Continued)

FOREIGN PATENT DOCUMENTS

CN  102036238 A  4/2011
WO  WO-2010012203 A1  2/2010
(Continued)

OTHER PUBLICATIONS

3GPP TR 33.833: "3rd Generation Partnership Project; Technical Specification Group Services and System Aspects Study on security issues to support Proximity Services (Release 12)", 3GPP Draft, DRAFT_S3-140247_PROSE_TR_UPDATE_V2_RM, 3rd Generation Partnership Project (3GPP), Mobile Competence Centre, 650, Route Des Lucioles, F-06921 Sophia-Antipolis Cedex, France, V0.4.0, Feb. 18, 2014 (Feb. 18, 2014), pp. 1-73, XP050771911, Retrieved from the Internet: URL: http://www.3gpp.org/ftp/tsg_sa/WG3_Security/TSGS3_74Taipei/Docs/ [retrieved on Feb. 18, 2014].
(Continued)

*Primary Examiner* — Joseph P Hirl
*Assistant Examiner* — J. Brant Murphy
(74) *Attorney, Agent, or Firm* — Qualcomm IP Dept.; James Hunt Yancey, Jr.

(57) ABSTRACT

A method, an apparatus, and a computer program product for wireless communication are provided. A method includes transmitting a request to a serving network with a nonce and a signature request directed to a network function of the serving network, receiving a response to the request from the serving network, and authenticating the serving network based on the signature of the network function. The nonce may provide replay protection. The response may include a signature of the network function. The request sent to the serving network may include a radio resource control
(Continued)

(RRC) message or a tracking area update (TAU) request. The serving network may be authenticated using a trusted third party to verify a certificate associated with the serving network.

30 Claims, 25 Drawing Sheets

(51) Int. Cl.
   *H04W 12/06* (2009.01)
   *H04W 76/04* (2009.01)
   *H04W 88/02* (2009.01)
   *H04W 12/12* (2009.01)

(52) U.S. Cl.
   CPC ......... *H04L 63/0869* (2013.01); *H04W 12/04* (2013.01); *H04W 12/06* (2013.01); *H04W 76/046* (2013.01); *H04W 12/12* (2013.01); *H04W 88/02* (2013.01)

(58) Field of Classification Search
   CPC ... H04W 12/06; H04W 76/046; H04W 88/02; H04W 12/12
   See application file for complete search history.

(56) References Cited

U.S. PATENT DOCUMENTS

| | | | |
|---|---|---|---|
| 8,839,373 B2 | 9/2014 | Palanigounder et al. | |
| 2005/0120219 A1* | 6/2005 | Munetoh | G06F 21/52 713/176 |
| 2005/0210252 A1* | 9/2005 | Freeman | G06F 21/31 713/171 |
| 2007/0060127 A1* | 3/2007 | Forsberg | H04L 63/061 455/436 |
| 2007/0113096 A1* | 5/2007 | Zhu | H04L 63/0407 713/180 |
| 2007/0256125 A1* | 11/2007 | Chen | G06F 21/33 726/18 |
| 2008/0307488 A1* | 12/2008 | Hammond, II | H04L 41/046 726/1 |
| 2009/0007275 A1* | 1/2009 | Gehrmann | G06F 21/445 726/27 |
| 2009/0217043 A1* | 8/2009 | Metke | G06F 21/445 713/171 |
| 2010/0281519 A1* | 11/2010 | Das | H04L 9/0838 726/3 |
| 2010/0293372 A1* | 11/2010 | Fischer | H04W 12/06 713/168 |
| 2011/0099361 A1* | 4/2011 | Shah | H04W 12/10 713/2 |
| 2011/0202755 A1* | 8/2011 | Orsini | H04L 63/029 713/151 |
| 2011/0314522 A1* | 12/2011 | Palanigounder | H04B 7/155 726/4 |
| 2012/0108205 A1* | 5/2012 | Schell | H04W 4/001 455/411 |
| 2012/0131341 A1* | 5/2012 | Mane | G06F 21/57 713/168 |
| 2012/0185692 A1* | 7/2012 | Hamlin | H04L 9/3231 713/155 |
| 2013/0012165 A1* | 1/2013 | Popovich | H04L 63/08 455/411 |
| 2013/0080769 A1* | 3/2013 | Cha | H04L 63/168 713/155 |
| 2016/0065362 A1* | 3/2016 | Choyi | H04L 63/065 380/279 |

FOREIGN PATENT DOCUMENTS

| | | |
|---|---|---|
| WO | WO-2012122529 A1 | 9/2012 |
| WO | WO-2013009508 A1 | 1/2013 |

OTHER PUBLICATIONS

International Search Report and Written Opinion—PCT/US2015/047297—ISA/EPO—dated Nov. 25, 2015.

Sun Y., et al., "Towards a Trusted Mobile RFID Network Framework", IEEE, International Conference on Cyber-Enabled Distributed Computing and Knowledge Discovery, Oct. 10, 2013 (Oct. 10, 2013), pp. 53-58, XP032534150, DOI: 10.1109/CYBERC.2013.18 [retrieved on Dec. 16, 2013].

TSG RAN WG2: "LS on RRC Connection Re-establishment", 3GPP Draft; R2-084906 LS TO SA3 on Re-Establishment, 3rd Generation Partnership Project (3GPP), Mobile Competence Centre, 650, Route Des Lucioles, F-06921 Sophia-Antipolis Cedex, France, vol. RAN WG2, No. Jeju, Korea, Aug. 18, 2008-Aug. 22, 2008, Aug. 22, 2008 (Aug. 22, 2008), 2 pages, XP050604029, [retrieved on Aug. 22, 2008] the whole document.

\* cited by examiner

ON-DEMAND SERVING NETWORK AUTHENTICATION

CROSS-REFERENCE TO RELATED APPLICATIONS

This application claims priority to and the benefit of Provisional Patent application No. 62/056,387 filed in the U.S. Patent Office on Sep. 26, 2014, the entire content of which is incorporated herein by reference.

TECHNICAL FIELD

The present disclosure relates generally to communication systems, and more particularly, to a system for authentication between user equipment and a serving network in a wireless communications system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. As multiple access technologies are improved and augmented, new telecommunication standards emerge. An example of an emerging telecommunication standard is the fourth generation Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology, and/or for new generations telecommunication standards with improved capabilities.

Security configuration is an initial step in setting up a logical bearer or channel (e.g., a communication link between a mobile communication device and a network entity or access node) in LTE networks. Key derivation and establishment is a part of this security configuration. Most of the keys generated are ciphering and integrity keys for Non-Access Stratum (NAS) Security Mode Configuration (NAS SMC) and Access Stratum (AS) Security mode Configuration (AS SMC). As new generations of communications technology are deployed, vulnerabilities to attack may be exposed in the security configuration processes. Accordingly, there exists a need for improvements in security processes. Preferably, improvements should be applicable to other multi-access technologies and the telecommunication standards that employ these technologies.

SUMMARY

In an aspect of the disclosure, a method, a computer program product, and an apparatus are provided.

According to certain aspects disclosed herein, a method of securing wireless communication between a user equipment (UE) and a serving network includes transmitting by the UE a connection request or tracking area request to a network function in a serving network after a security association has been established between the UE and the serving network where the request includes a nonce and a signature request, receiving by the UE a response to the connection request or tracking area request from the network function where the response includes a signature of the network function, and authenticating by the UE the serving network based on the signature of the network function and a public key certificate corresponding to the network function where the public key certificate is signed using a private key of the serving network provided by a network operator associated with the serving network.

According to certain aspects disclosed herein, an apparatus has a wireless transceiver, and a processor coupled to the transceiver. The processor may be configured to transmit a connection request or tracking area request to a network function in a serving network after a security association has been established between the UE and the serving network where the request includes a nonce and a signature request, receive a response to the connection request or tracking area request from the network function where the response includes a signature of the network function, and authenticate the serving network based on the signature of the network function and a public key certificate corresponding to the network function, where the public key certificate is signed using a private key of the serving network provided by a network operator associated with the serving network.

According to certain aspects disclosed herein, a method of proving membership of a serving network includes receiving a first message from a UE after the UE has established a secured connection with a home network, where the message is directed to a network function of the serving network and may include a nonce and a signature request, generating a signature using an operator-signed certificate maintained by the network function of the serving network, and transmitting a second message to the UE, where the signature is attached to the second message.

According to certain aspects disclosed herein, an apparatus includes means for receiving a first message from a UE after the UE has established a secured connection with a home network, where the message is directed to a network function of the serving network and includes a nonce and a signature request, means for generating a signature using an operator-signed certificate maintained by the network function of the serving network, and means for transmitting a second message to the UE, where the signature is attached to the second message. The signature attached to the second message may be generated to prove to the UE that the apparatus is a member of a serving network. The operator-signed certificate may be a public key certificate signed by an operator of the serving network.

DETAILED DESCRIPTION

Figure 1:
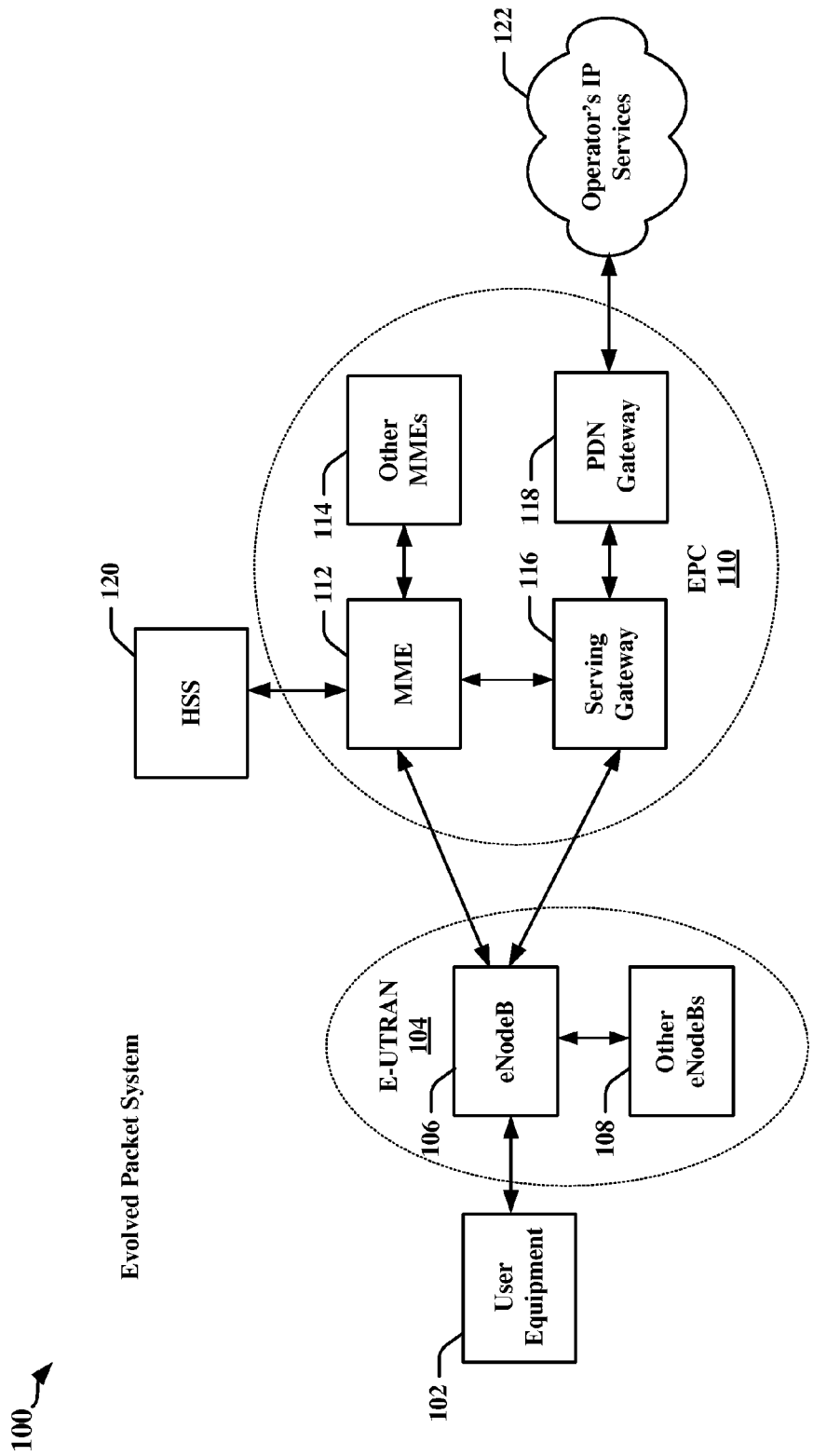
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a computer or "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Computer-readable media may include transitory and non-transitory storage media that may be read and/or manipulated by one or more processors. Storage media may be any available media that can be accessed by a computer.

By way of example, and not limitation, such computer-readable media can comprise random access memory (RAM), read only memory (ROM), programmable ROM (PROM), erasable PROM (EPROM), electrically erasable PROM (EEPROM), compact disc read only memory (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Certain aspects disclosed herein relate to systems and methods by which radio link setup and/or bearer establishment processes may be secured. Certain aspects of the disclosure address security issues that may arise in newer generations of radio access technologies (RATs), including in fifth generation (5G) and later networks, as well as in fourth generation (4G) and earlier networks. The configuration and operation of a 4G LTE network architecture is described herein by way example, and for the purpose of simplifying descriptions of certain aspects that may apply to multiple RATs.

FIG. 1 is a diagram illustrating an LTE network architecture 100. The LTE network architecture 100 may be referred to as an Evolved Packet System (EPS). The EPS may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control planes protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), an eNB, or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a virtual reality device, a tablet computing device, a media player, an appliance, a gaming device, a wearable computing device such as a smartwatch or optical head-mounted display, or any other similarly functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an "S1" interface to the EPC 110. The EPC 110 includes an MME 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
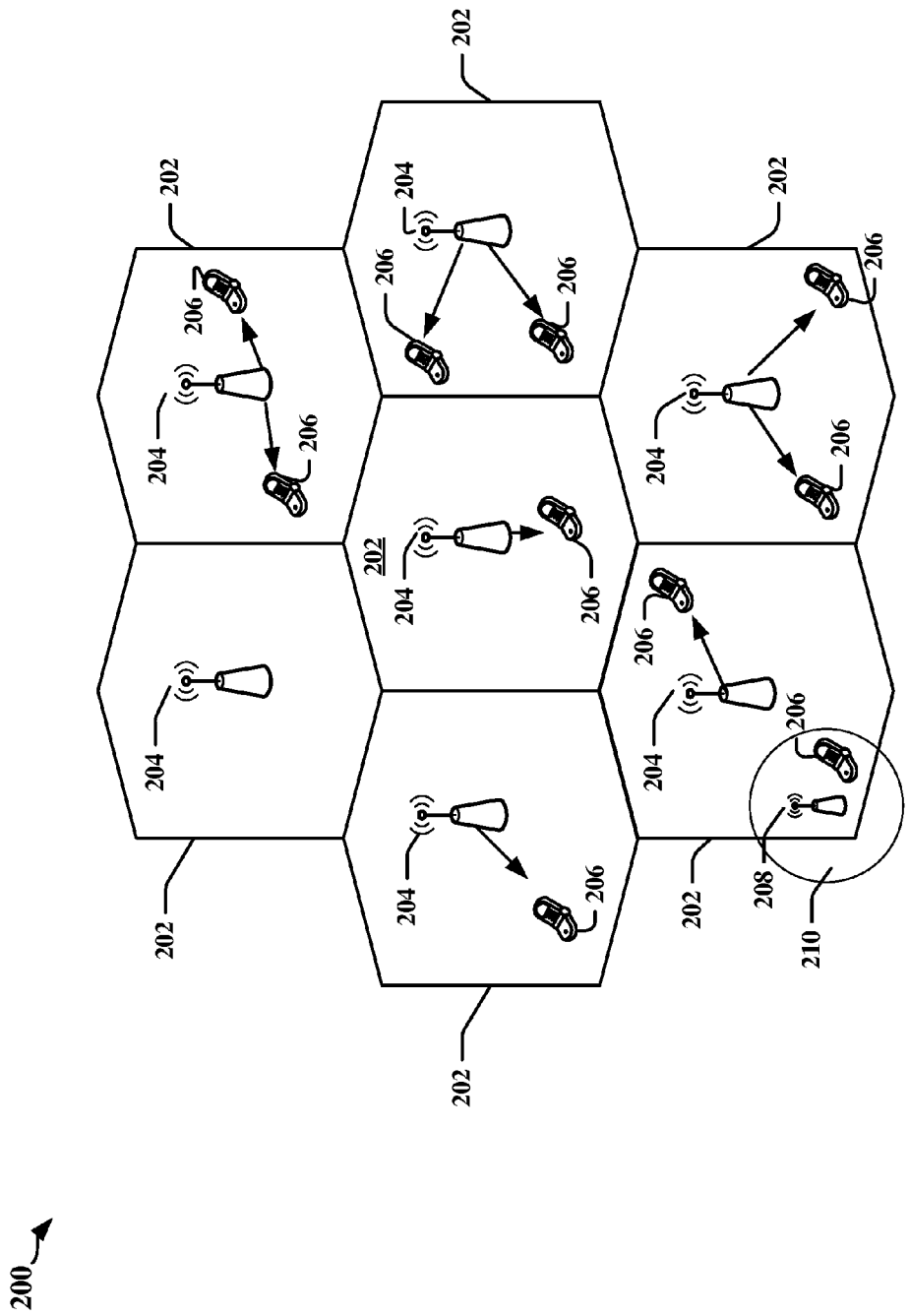
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower-power class eNodeBs 208 may have cellular regions 210 that overlap with one or more of the cells 202. The lower-power class eNodeB 208 may be a femto cell (e.g., home eNodeB (HeNB)), pico cell, micro cell, or remote radio head (RRH). The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
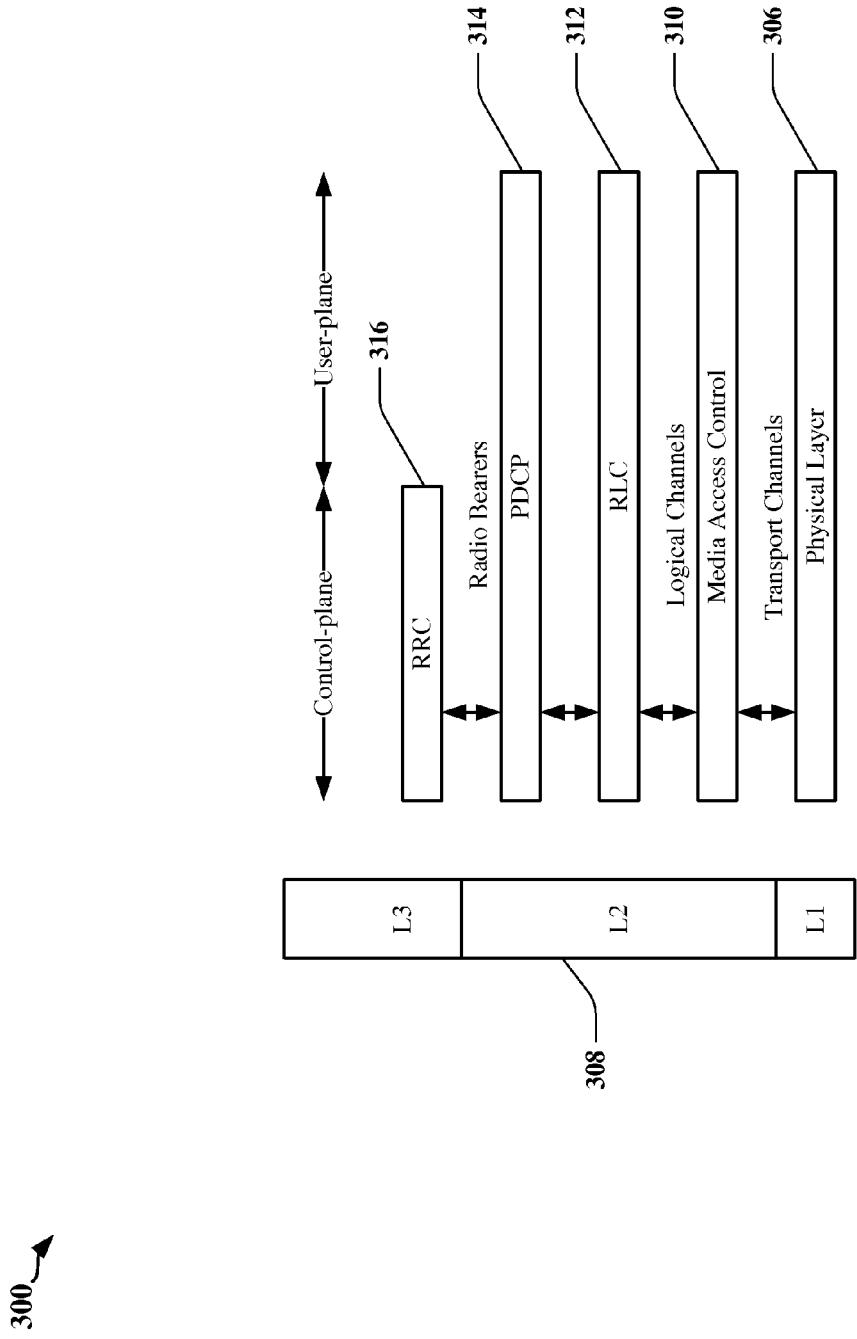
FIG. 3 is a diagram illustrating an example of a radio protocol architecture for user and control planes.

FIG. 3 is a diagram 300 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNodeB over the physical layer 306.

In the user plane, the L2 layer 308 includes a media access control sublayer (Media Access Sublayer) 310, a radio link control (RLC) sublayer 312, and a packet data convergence protocol (PDCP) sublayer 314, which are terminated at the eNodeB on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNodeBs. The RLC sublayer 312 provides segmentation and reassembly of upper layer data packets, retransmission of lost data packets, and reordering of data packets to compensate for out-of-order reception due to hybrid automatic repeat request (HARQ). The Media Access Sublayer 310 provides multiplexing between logical and transport channels. The Media Access Sublayer 310 is also responsible for allocating the various radio resources (e.g., resource blocks) in one cell among the UEs. The Media Access Sublayer 310 is also responsible for HARQ operations.

In the control plane, the radio protocol architecture for the UE and eNodeB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the eNodeB and the UE.

Figure 4:
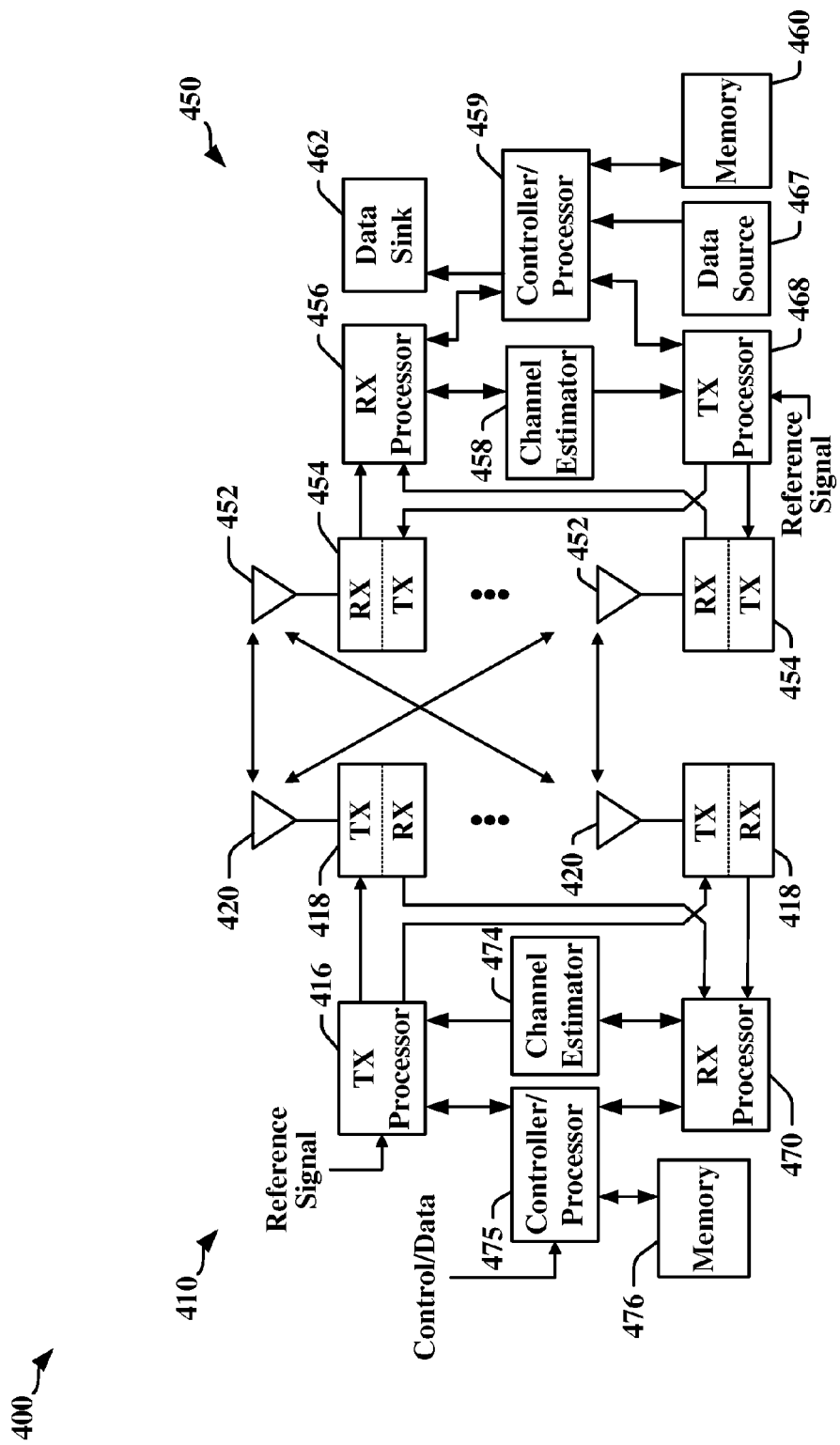
FIG. 4 is a diagram illustrating an example of an evolved Node B and user equipment (UE) in an access network.

FIG. 4 is a block diagram of an eNodeB 410 in communication with a UE 450 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions include coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNodeB 410. These soft decisions may be based on channel estimates computed by the channel estimator 458. The soft decisions are then decoded and deinterleaved to recover the data and control signals that were originally transmitted by the eNodeB 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the eNodeB 410, the controller/processor 459 implements the L2 layer for the user plane and the control plane by providing header compression, ciphering, packet segmentation and reordering, and multiplexing between logical and transport channels based on radio resource allocations by the eNodeB 410. The controller/processor 459 is also responsible for HARQ operations, retransmission of lost packets, and signaling to the eNodeB 410.

Channel estimates derived by a channel estimator 458 from a reference signal or feedback transmitted by the eNodeB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNodeB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Bearer Setup in LTE Networks

Radio link setup in an LTE network may involve establishment of one or more radio bearers between an access node that provides access to a network and a communication device. Radio link setup typically includes a security activation exchange. A session bearer, which may be a logical bearer or logical channel, may then be established over the radio link and one or more services and/or communications may be established over the session bearer. The session bearer, services and/or communications may be secured by one or more security keys.

As part of the session bearer setup, an authentication request, and/or one or more key exchanges may take place. In networks operating according to an LTE-compatible protocol, keys may be derived by the communication device based on algorithms provided by one or more network entities.

Example of E-UTRAN Key Hierarchy

Figure 5:
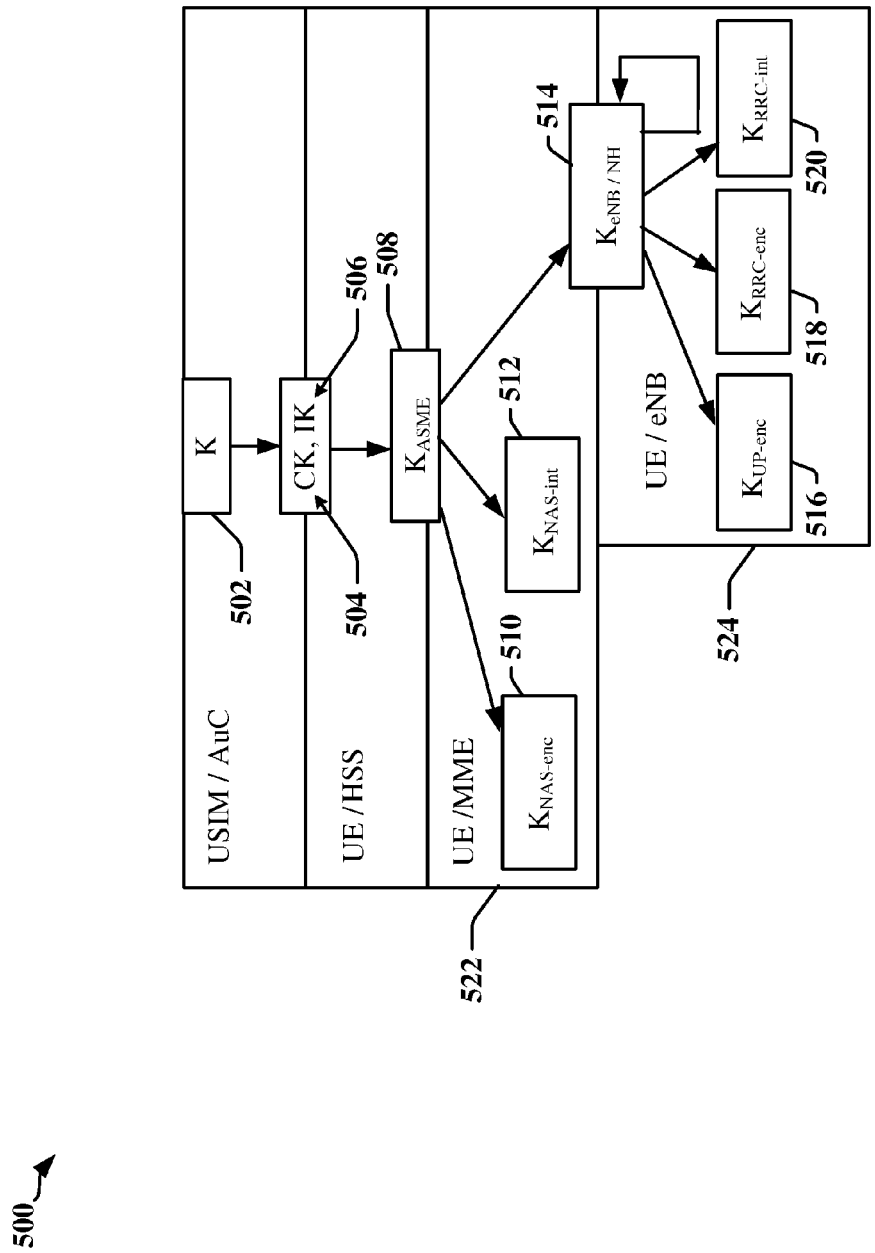
FIG. 5 illustrates an example of E-UTRAN key hierarchy that may be implemented within a network such as an LTE wireless network.

FIG. 5 illustrates a typical E-UTRAN key hierarchy 500 that may be implemented within a typical LTE network. In the communication device, a Universal Subscriber Identity Module (USIM) and an Authentication Center (AuC) in a network entity at the network side use a master key (K) 502 to generate a cipher key (CK) 504 and integrity key (IK) 506. The cipher key (CK) 504 and integrity key (IK) 506 may then be used by the communication device and a Home Subscriber Server (HSS) in the network entity to generate an Access Security Management Entity key ($K_{ASME}$) 508. The security activation of a communication device operating in an LTE network may be accomplished through an Authentication and Key Agreement procedure (AKA), Non-Access Stratum (NAS) Security Mode Configuration (NAS SMC) and Access Stratum (AS) Security mode Configuration (AS SMC). AKA is used to derive the $K_{ASME}$ 508, which is then used as a base key for the calculation of NAS keys 510 and 512 and AS keys 514, 516, 518, and 520. The communication device and an MME at the network side may then use the $K_{ASME}$ 508 to generate one or more of these security keys.

Figure 6:
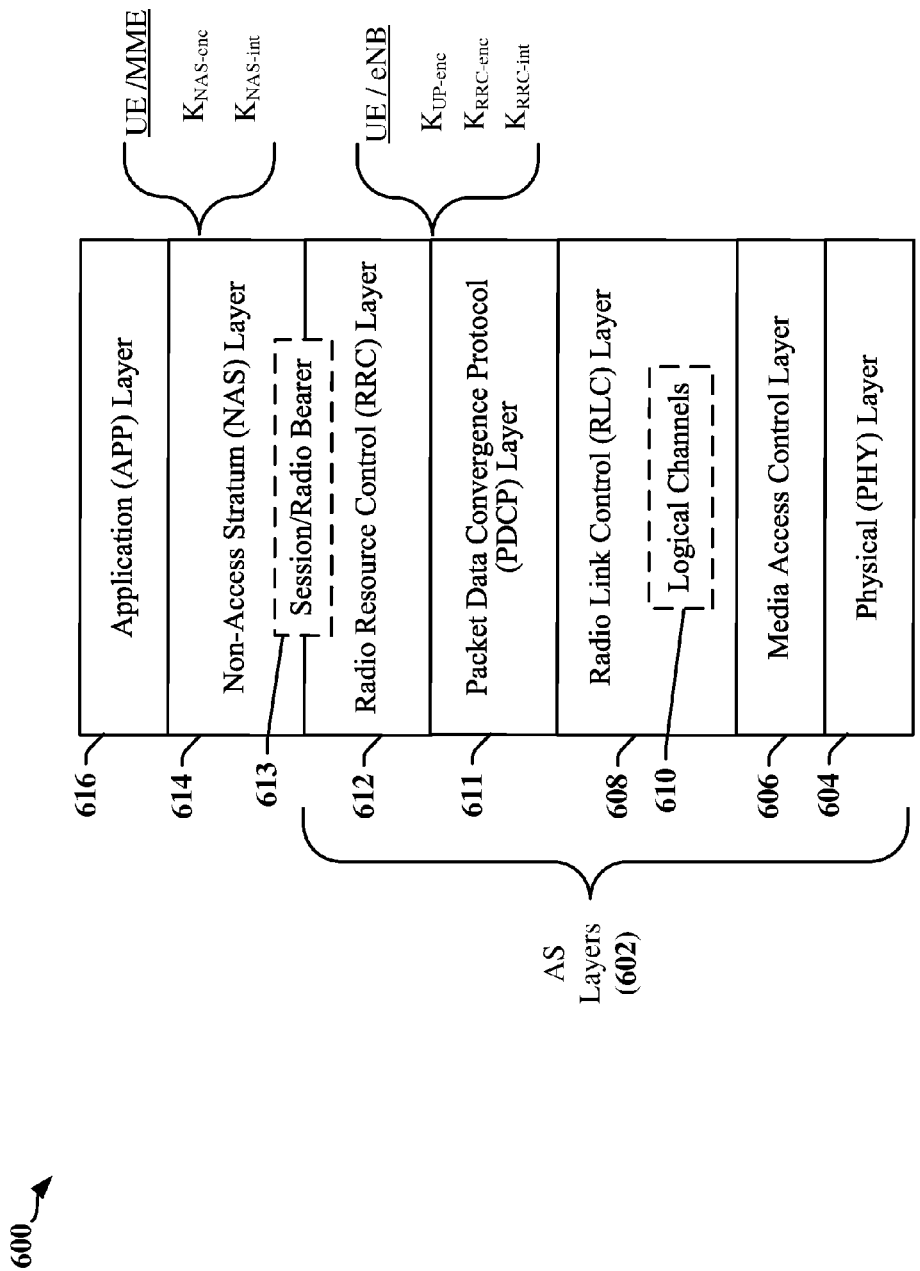
FIG. 6 illustrates a protocol stack that may be implemented in a communication device operating in an LTE packet-switched network.

LTE packet-switched networks may be structured in multiple hierarchical protocol layers, where the lower protocol layers provide services to the upper layers and each layer is responsible for different tasks. For example, FIG. 6 illustrates an example of a protocol stack 600 that may be implemented in a communication device operating in a LTE packet-switched network. In this example, an LTE protocol stack 600 includes a Physical (PHY) Layer 604, a Media Access Control Layer 606, a Radio Link Control (RLC) Layer 608, a Packet Data Convergence Protocol (PDCP) Layer 611, a RRC Layer 612, a NAS Layer 614, and an Application (APP) Layer 616. The layers below the NAS Layer 614 are often referred to as the Access Stratum (AS) Layer 602.

The RLC Layer 608 may include one or more channels 610. The RRC Layer 612 may implement various monitoring modes for the UE, including connected state and idle state. The NAS Layer 614 may maintain the communication device's mobility management context, packet data context and/or its IP addresses. Note that other layers may be present in the protocol stack 600 (e.g., above, below, and/or in between the illustrated layers), but have been omitted for the purpose of illustration. Radio/session bearers 613 may be established, for example at the RRC Layer 612 and/or NAS Layer 614. Consequently, the NAS Layer 614 may be used by the communication device and an MME to generate the security keys $K_{NAS\text{-}enc}$ 510 and $K_{NAS\text{-}int}$ 512. Similarly, the RRC Layer 612 may be used by the communication device and an eNodeB to generate the security keys $K_{UP\text{-}enc}$ 516, $K_{RRC\text{-}enc}$ 518, and $K_{RRC\text{-}int}$ 520. While the security keys $K_{UP\text{-}enc}$ 516, $K_{RRC\text{-}enc}$ 518, and $K_{RRC\text{-}int}$ 520 may be generated at the RRC Layer 612, these keys may be used by the PDCP Layer 611 to secure signalling and/or user/data communications. For instance, the key $K_{UP\text{-}enc}$ 516 may be used by the PDCP Layer 611 to secure for user/data plane (UP) communications, while the keys $K_{RRC-enc}$ 518, and $K_{RRC-int}$ 520 may be used to secure signalling (i.e., control) communications at the PDCP Layer 611.

In one example, prior to establishing these security keys (keys $K_{NAS-enc}$ 510, $K_{NAS-int}$ 512, $K_{UP-enc}$ 516, $K_{RRC-enc}$ 518, and/or $K_{RRC-int}$ 520), communications to/from a communication device may be transmitted (unprotected or unencrypted) over an unsecured common control channel (CCCH). After these security keys are established, these same user data and/or control/signaling communications may be transmitted over a Dedicated Control Channel (DCCH).

During the connection setup/session bearer setup procedures in an LTE-compatible network, AKA and NAS SMC procedures are optional if there is an existing native NAS security context already present from the previous setup sessions. The existing NAS context may be reused at the time of Service Requests, Attach Requests and TAU Requests. TAU requests may be sent periodically by a UE or when the UE enters a tracking area that was not associated with the UE, where the tracking area (or routing area) may be an area in which a UE is able to move without first updating the network.

Security keys used for ciphering and integrity algorithms, both at the AS (User plane and RRC) and NAS may be derived using an individual algorithm identity provided as one of the inputs. At the NAS level (e.g., NAS Layer 614), this is provided to the communication device by the access node (eNodeB) in NAS Security Mode Command during the NAS SMC procedure. At the AS level, the algorithms to be used are provided by the Radio Resource Control (RRC) Security Mode Command. Key generation may be done with a key derivation function (KDF), such as the HMAC-SHA-256 function. In generating the NAS security keys $K_{NAS-ene}$ 510 and integrity key $K_{NAS-int}$ 512 and RRC security keys $K_{UP-enc}$ 516, $K_{RRC-enc}$ 518, and integrity key $K_{RRC-int}$ 520, the key derivation function KDF takes several types of inputs, including an input algorithm identity provided by the network during a security activation exchange. For instance, the input algorithm identity may identify either Advanced Encryption Standard (AES) or "SNOW-3G."

It should be noted that, in some implementations, all security keys (e.g., NAS ciphering and integrity keys and RRC ciphering and integrity keys) are generated using the same key derivation function (KDF), e.g., HMAC-SHA-256, that uses a root/base key (e.g., $K_{ASME}$), one or more fixed inputs, and one of the plurality of possible input algorithm identities (i.e., security key=KDF (root/base key, fixed input(s), algorithm identity)).

An Example of an AKA Procedure

Figure 7:
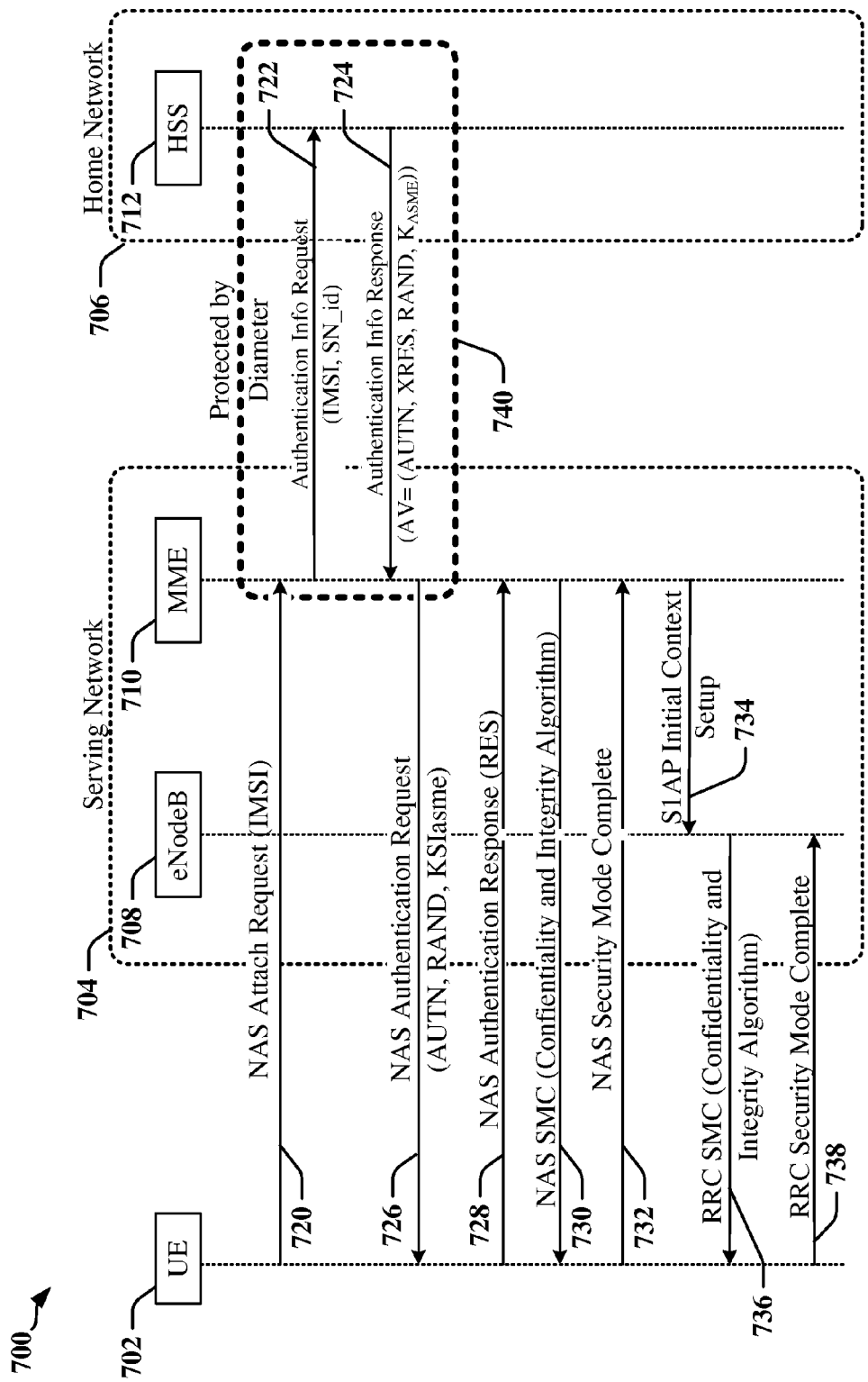
FIG. 7 is a message flow diagram illustrating authentication in the example of an LTE wireless network.

FIG. 7 is a flow diagram 700 that illustrates an example of authentication in an LTE wireless network. A UE 702 may connect to the network through a serving network 704 in order to obtain services from a home network 706 provided by a network operator. During bearer setup, the UE 702 may establish a secured connection with an HSS 712 of the home network 706. The UE 702 may trust the HSS 712, while the eNodeB 708 of the serving network 704 may be untrusted. The UE 702 may transmit a NAS Attach Request 720 with identifying information such as an International Mobile Subscriber Identity (IMSI). The MME 710 receives the NAS Attach request 720 and forwards the request 720 in an Authentication Information Request message 722 to the HSS 712. The Authentication Information Request message 722 may include the IMSI of the UE 702 and a serving network identifier (SN_id). The HSS 712 may respond with an Authentication Information Response message 724 that includes an authentication value (AUTN), an expected result value (XRES) a random number and a $K_{ASME}$. The AUTN is generated by an AuC and, together with the RAND, authenticates the HSS 712 to the UE 702. The messages 722, 724 between the MME 710 and the HSS 712 are communicated on a link 740 and protected an authentication, authorization, and accounting protocol (Diameter).

The MME 710 transmits a NAS Authentication Request 726 to the UE 702, which responds with a NAS Authentication Response message 728. The NAS Authentication Request 726 includes the AUTN, RAND and a Key Set Identifier ($KSI_{ASME}$). The MME 710 may transmit a Non-Access Stratum (NAS) Security Mode Configuration (NAS SMC) message 730 to the UE 702. The UE 702 then transmits an "NAS Security Mode Complete" message 732 to the MME 710, which signals the eNodeB 708 an "S1AP Initial Context Setup" message 734. The eNodeB 708 may then transmit an RRC Non-Access Stratum (NAS) Security Mode Configuration (RRC SMC) message 736 to the UE 702, which responds with an RRC Security Mode Complete message 738 when ready.

In certain network implementations, the serving network 704 is trusted for some period of time after authentication has been accomplished. In one example, the serving network 704 may be trusted after authentication until another authentication process (AKA) is performed with the HSS 712. The duration of time that established trust survives may be determined by a network operator. The network operator may configure the period of trust to endure for a number of hours, days, or weeks.

Examples of Security Concerns in Evolving Network Technologies

Due to development of 4G, 5G, and other networking technologies, certain network functions may be pushed towards the network edge. In some instances, the relocation of one or more network functions can degrade or invalidate trust on a cellular core network.

In one example, a femtocell or home eNodeB (HeNB) may be deployed to provide localized wireless service from through a broadband connection. A femtocell may be characterized as a small, low-power cellular base station, typically designed for use in a home or small business environment. A femtocell may be any small cell, typically with limited range and/or a limited number of active attached UEs that connects to a network operator's network through a wide area network or connection. The femtocell may be operable in one or more networks, including WCDMA, GSM, CDMA2000, TD-SCDMA, WiMAX and LTE networks. The deployment of newer technologies and/or the use of femtocells may result in the handling of network functions in less protected and/or isolated locations that are more susceptible to attack. For these and other reasons, the level of security provided by a small cell or relay node may be significantly degraded with respect to the security provided by a macro cell. Increased deployment of small cells, and relays to support for multiple hops within a network can be expected.

In another example, network functions in certain newer technologies may be located in shared systems, and/or provided in a cloud environment. In such systems and environments, networking and computing functions may be virtualized, and often managed by a third party provider. While network operators may be capable of securing access paths to the cloud, security of the cloud interior cannot be guaranteed. In some instances, tradeoffs are made between internal security of the virtual (cloud) environment and virtualized system performance. In some instances, network operators need not own the network equipment used to connect UEs, and/or the different components of network equipment in a network may be owned by different operators. Reduced isolation between operators may result, and some network operators may have easier access to other network operator's credentials. For example, credentials of a first network operator may be more easily misappropriated by a second network operator when both network operators share a common eNodeB or MME.

Networks may be implied to be insecure when certain security assumptions are invalidated. In 4G AKA, for example, the HSS is a trusted network entity, and the HSS may be a root of trust. Mutual authentication between a UE and a serving network may depend on the security between the HSS and the serving network. The HSS authenticates the serving network on behalf of UE and provides the authentication credentials for the UE to the serving network through a secure channel.

Figure 8:
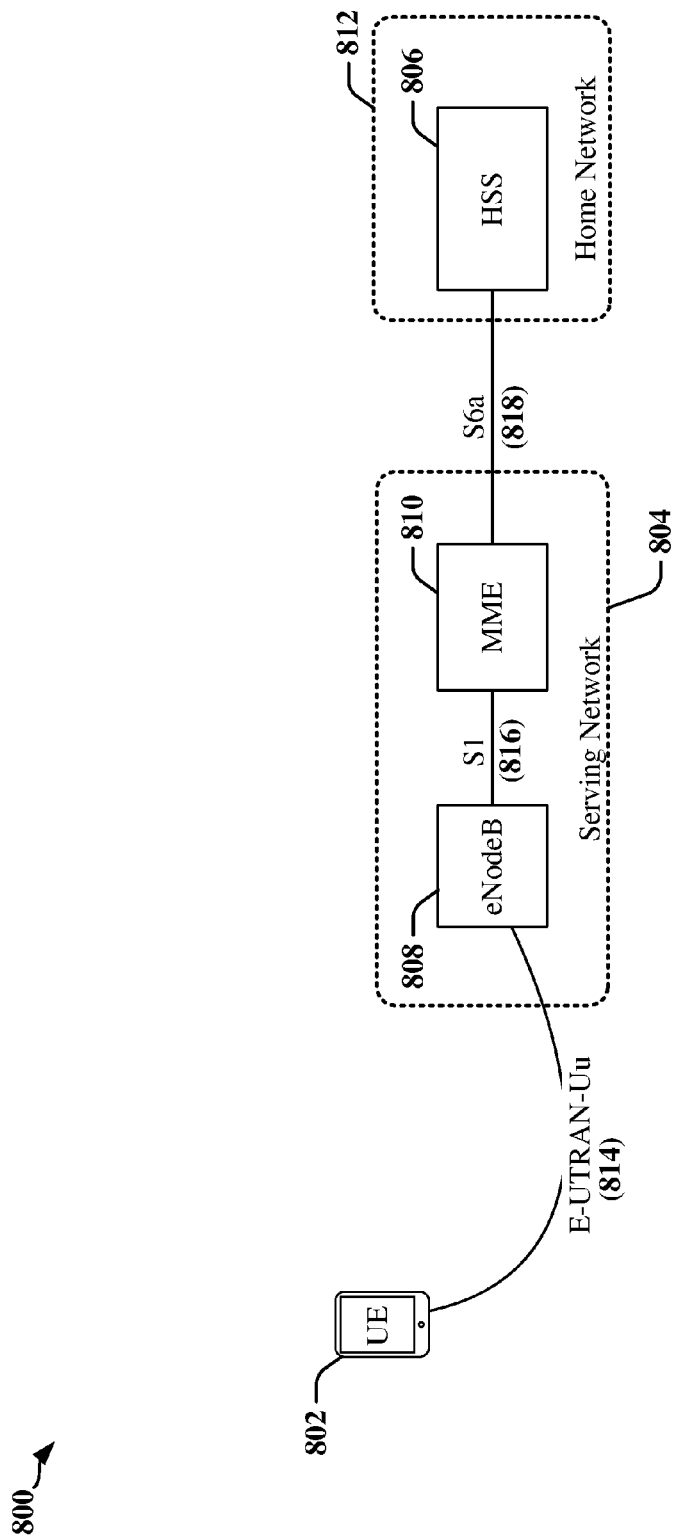
FIG. 8 illustrates a network environment in which a UE connects with a serving network in order to obtain services from a home network.

FIG. 8 is a simplified block diagram 800 illustrating a network environment in which a UE 802 connects with a serving network 804 in order to obtain services from a home network 812. In the example depicted, the UE 802 may establish a wireless connection 814 with an MME 810 through an eNodeB 808 provided in an E-UTRAN operated as part of a serving network 804. The MME 810 is connected through a link 818 to an HSS 806 of the home network 812.

The eNodeB 808 and/or MME 810 of the serving network may be compromised due to shared usage of network hardware, relocation of network functions to the network edge and/or the placement of the eNodeB 808 and/or MME 810 in a public or otherwise unsecured physical location.

Figure 9:
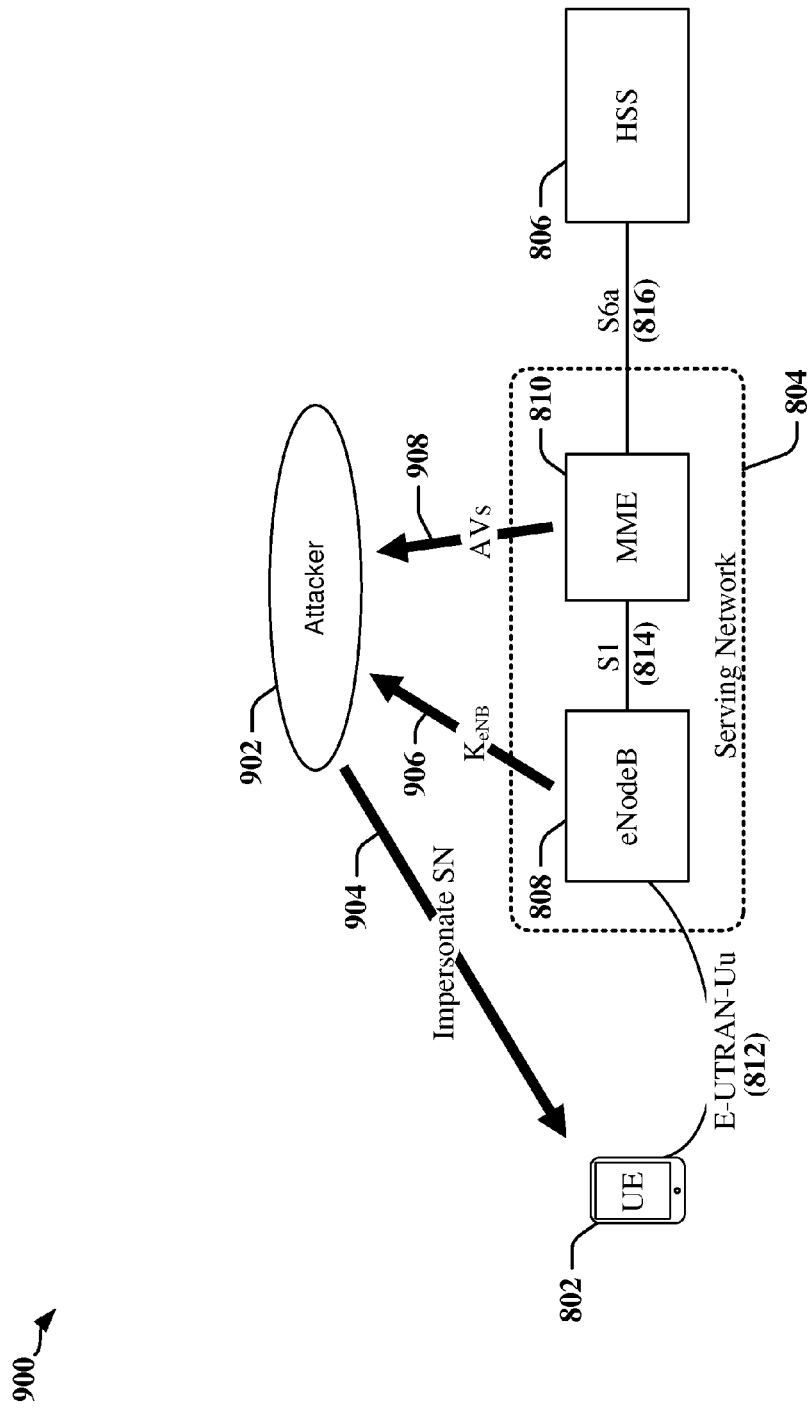
FIG. 9 is a diagram illustrating a first example of vulnerability in a wireless network.

FIG. 9 is a simplified block diagram 900 illustrating certain vulnerabilities of the serving network 804. An attacker 902 may exploit certain protocol and/or software vulnerabilities in order to acquire session credentials. The attacker 902 may include functions that can use the session credentials to impersonate (through a communications link 904) a valid operator's serving network 804 and to capture information from a UE 802 that attempts to establish a connection with the operator network 804 compromised by the attacker 902.

In one example, an attack may be characterized as a heart-bleed attack when the attacker 902 exploits an implementation flaw in an otherwise sound security protocol. The attacker 902 may take advantage of colocation of network equipment or network functions to acquire credentials such as authentication vectors (AVs) 908 transmitted to an MME 810 and/or encryption keys (KeNB) 906 used, maintained or generated by the eNodeB 808. The credentials may be acquired from the eNodeB 808, the MME 810 and/or from portions of interconnects 814, 816 available to collocated hardware that provide shared network equipment or functions.

Session credentials are retrieved from the HSS 806 infrequently, and may remain valid for a period of time that may be measurable in hours, or days. An attacker 902 having intercepted the credentials can impersonate a serving network 804 until the next authentication procedure is performed with the HSS 806.

In one example, the attacker 902 may intercept the credentials after an AKA procedure. The attacker 902 may be a rogue public land mobile network (PLMN) that can impersonate a serving network 804 provided by a valid network operator. Vulnerabilities in the eNodeB 808, the MME 810 and/or the interconnects 814, 816 may be monitored by the attacker in order to capture an IMSI associated with the UE 802, information including keys 906 and other credentials such as authentication vectors 908 related to the establishment of a connection by or on behalf of the UE 802. In some instances, an MME in the attacker 902 may impersonate an MME 810 in the valid serving network 804 and establish a communications link 904 with the UE 802 using intercepted IMSI, authentication vectors 908 and keys 906. Network entities of the attacker 902 may then have access to the information on the UE 802 and may monitor communications originating from the UE 802.

Enhanced Authentication of Serving Networks

According to certain aspects disclosed herein, the security of a network may be enhanced by authenticating the serving network 804 while network connections are being established. The UE 802 may be adapted or configured to authenticate a serving network 804 as completely as possible, and when necessary. That is to say, the UE 802 may be configured to avoid unnecessary authentication procedures when connections with the serving network are active and the serving network can be trusted based on prior authentication.

In order to authenticate the serving network and to avoid attacks based on acquisition of session secrets such as authentication vectors for the UE 802, a list of trusted networks may be maintained at the UE 802, where the list identifies public or shared keys, certificates and/or other credentials corresponding to the trusted networks. In one example, the UE 802 may be provisioned with a trusted PLMN list and corresponding public key certificates. The eNodeB 808 and MME 810 may be provisioned with public key certificates signed by their respective operators, which may be the same operator, and which may include the operator of the serving network 804. The private key corresponding to the public key used by the network functions, including the eNodeB 808 and MME 810, is maintained in a secure storage or secure execution environment, such as a TrE, and an attacker cannot typically acquire the private key held in the TrE.

Figure 10:
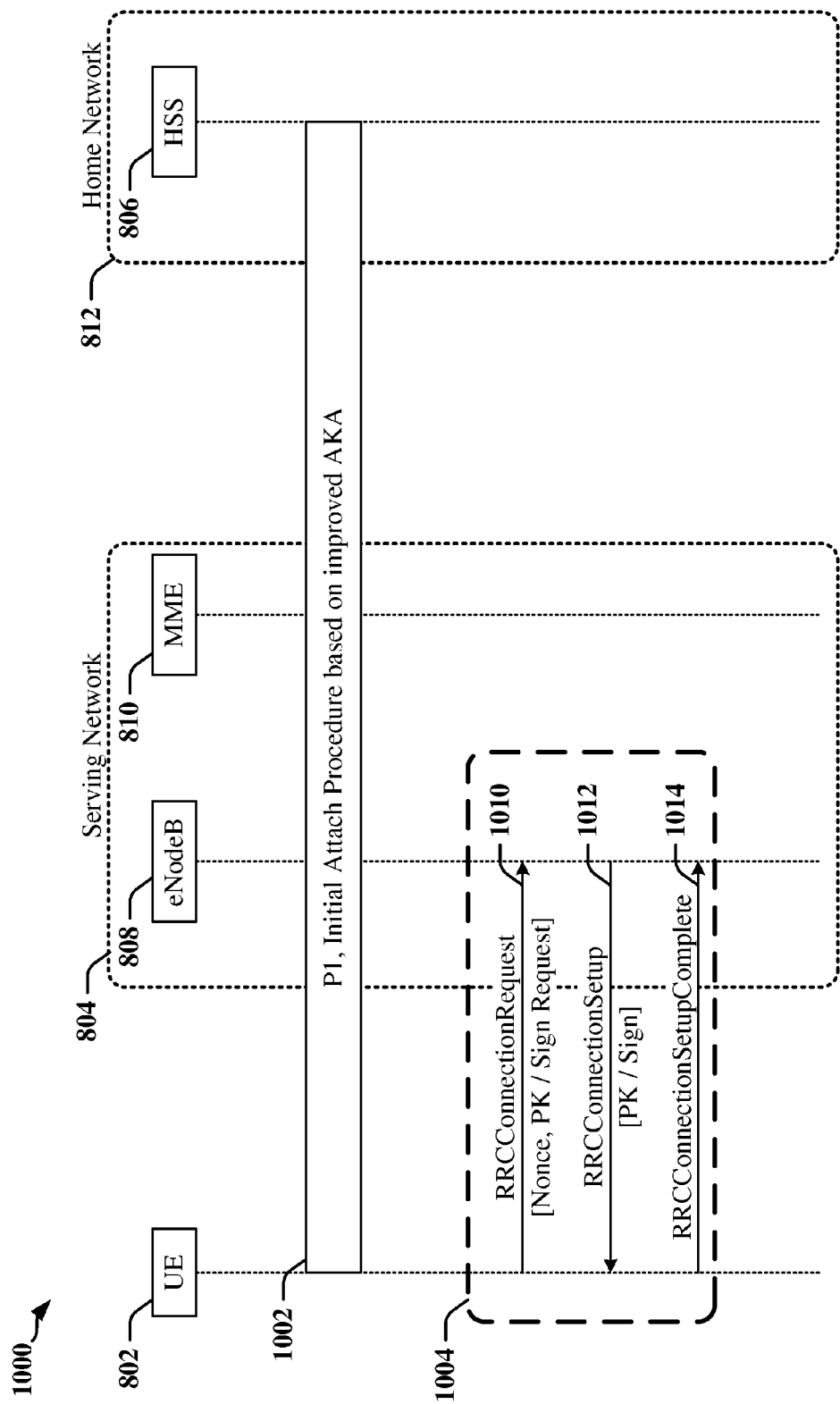
FIG. 10 is a message flow diagram illustrating a first example of connection request messages used for on-demand authentication of the serving network through an eNodeB in accordance with certain aspects disclosed herein.
Figure 11:
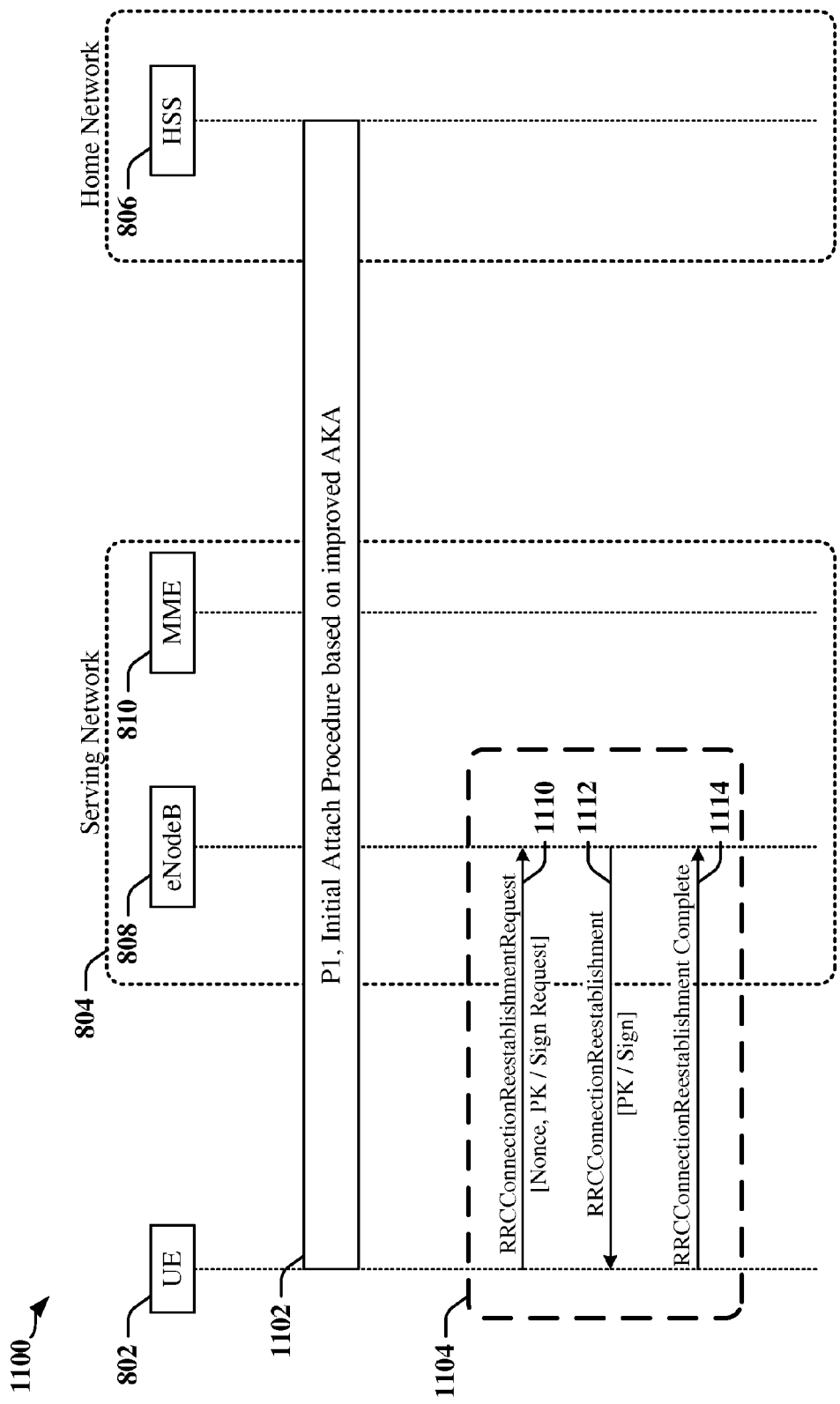
FIG. 11 is a message flow diagram illustrating a second example of connection request messages used for on-demand authentication of the serving network through an eNodeB in accordance with certain aspects disclosed herein.
Figure 12:
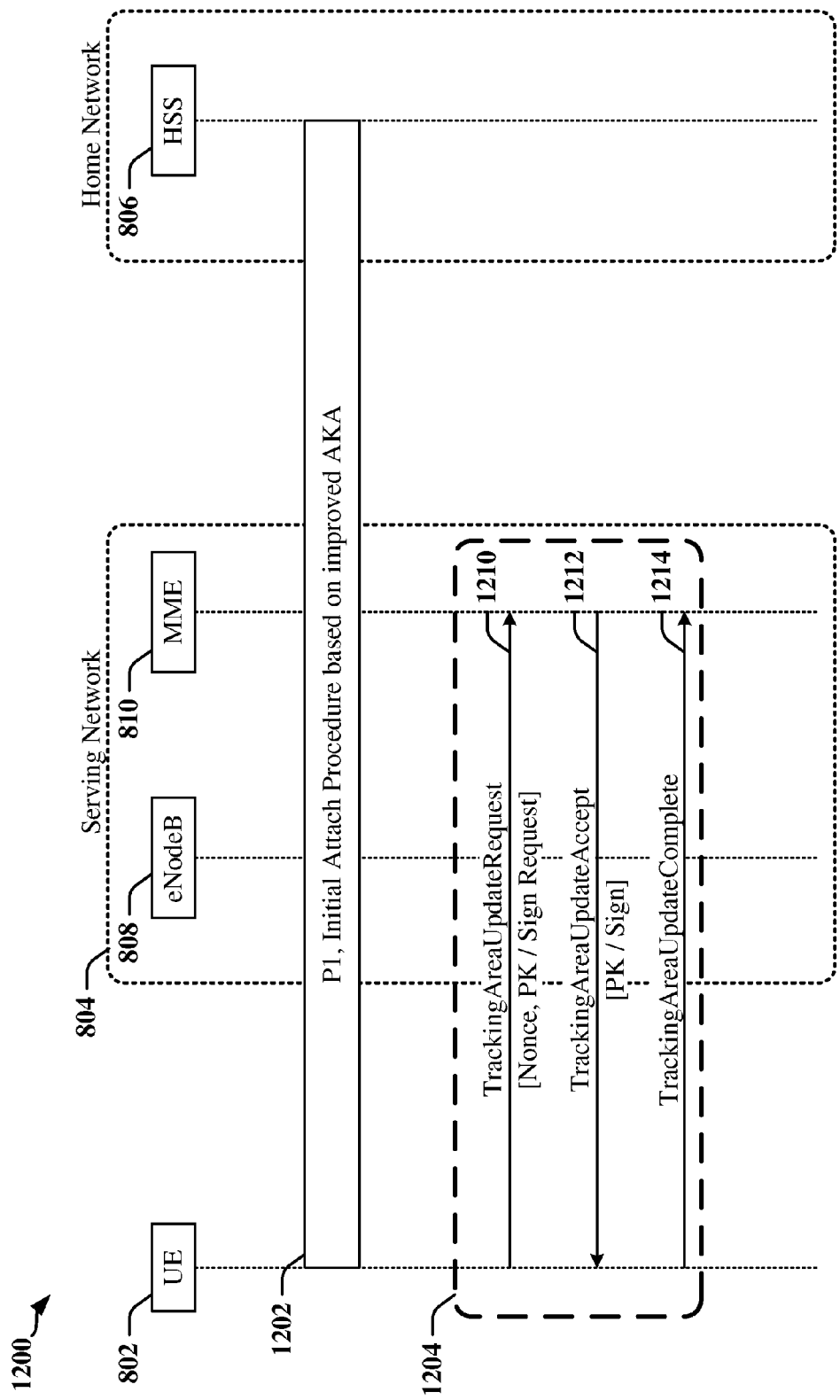
FIG. 12 is a message flow diagram illustrating a first example of tracking area update (TAU) messages used for on-demand authentication of the serving network through a Mobility Management Entity (MME) in accordance with certain aspects disclosed herein.

FIGS. 10, 11 and 12 are message flow diagrams 1000, 1100, 1200 that illustrate examples of on-demand processes for authenticating the serving network 804 using a public-key based approach. An operator-signed public key is used to authenticate the serving network 804. The serving network 804 may be provisioned with a certificate signed by a trusted third party (TTP) such as Verisign or the Internet Assigned Numbers Authority (IANA). In some instances, the serving network 804 may employ a self-signed certificate that is provided by the home network 812 to the UE 802 in a list of trusted certification authorities (CAs). The list of trusted CAs may include operators and their corresponding public keys. The list of trusted CAs and public key or certificates may be distributed to roaming partners through a secure channel.

Network functions, including the MME 810 and the eNodeB 808 may prove their membership of the serving network 804 using an operator-signed certificate. An attacker that does not possess the private-key corresponding to the public key issued for network functions cannot authenticate itself to UE 802.

According to certain aspects disclosed herein, signaling and/or messages initiated by the UE 802 may be leveraged to enable on-demand authentication of the serving network 804. Baseline overhead and be avoided and idle state overhead may be eliminated through "piggybacking" authentication of the serving network 804 on such signaling.

RRC messages may be used to authenticate the eNodeB 808. Examples of such RRC messages include RRC connection request, and RRC connection reestablishment. The UE 802 may request that the connection messages exchanged with the eNodeB 808 be signed. In some instances, the UE 802 may request the public key of the eNodeB 808.

TAU or service request messages may be used to authenticate the MME 810. In one example, the UE 802 may request that TAU or service request accept messages exchanged with the MME 810 be signed. In some instances, the UE 802 may request the public key of the MME 810.

FIG. 10 is a message flow diagram 1000 that illustrates a first example of the use of RRC messages 1004 for on-demand authentication of the serving network 804 through the eNodeB 808. The UE 802 may initiate an AKA procedure 1002. Upon successful completion of the AKA procedure 1002, the UE 802 may authenticate the serving network 804 using the RRC messages 1004. An RRC connection request (or connection establishment request) 1010 may be employed as part of the authentication. In one example, an RRC connection request 1010 may be transmitted to the eNodeB 808 during transitions from idle mode. When a UE 802 goes into idle mode, the eNodeB 808 may drop the security context for UE 802 for power-saving reasons. According to certain aspects, the UE 802 may transmit an RRC connection request 1010 that includes additional fields. The additional fields may include a Nonce, and a request for the signature of the eNodeB 808. In some instances, the additional fields may also include a request for the public key of the eNodeB 808. The Nonce may be an arbitrary, random or pseudo-random number used to ensure that previous communications cannot be reused in replay attacks. The eNodeB 808 may transmit an RRC connection setup response 1012 that is signed using its private key and, upon verification of the authenticity of the eNodeB 808, the UE 802 may signal RRC connection setup complete 1014.

FIG. 11 is a message flow diagram 1100 that illustrates a second example of the use of RRC messages 1104 for on-demand authentication of the serving network 804 through the eNodeB 808. The UE 802 may initiate an AKA procedure 1102. Upon successful completion of the AKA procedure 1102, the UE 802 may authenticate the serving network 804 using the RRC messages 1104. An RRC connection reestablishment request 1110 may be employed, for example, during connection failure recovery. According to certain aspects, the UE 802 may transmit an RRC connection reestablishment request 1110 that includes additional fields. The additional fields may include a Nonce, and a request for the signature of the eNodeB 808. In some instances, the additional fields may also include a request for the public key of the eNodeB 808. The eNodeB 808 may transmit a connection reestablishment response 1112 that is signed using its private key and, upon verification of the authenticity of the eNodeB 808, the UE 802 may signal RRC connection setup complete 1114. The process illustrated by the example of the message flow diagram 1100 of FIG. 11 may prevent an attack that causes a disconnect in order to intercept credentials during failure recovery procedures.

The UE 802 may authenticate the serving network 804 using RRC messages as needed when there is data to be transmitted, data to be received, or before or after a handover to another network function. RRC connection, establishment and/or reestablishment requests are initiated by the UE 802 and such requests require a response from the eNodeB 808. In some instances, the UE 802 may determine that it is unnecessary to continually authenticate the serving network 804. For example, authentication need not be performed when the UE 802 is in an idle state and no handover is indicated. Overhead associated with the baseline protocol can be minimized when signatures are provided on-demand. The eNodeB 808 typically provides the network function certificate only upon request.

FIG. 12 is a message flow diagram 1200 that illustrates a first example of TAU messages 1204 used for on-demand authentication of the serving network through the MME 810. The UE 802 may initiate an AKA procedure 1202. Upon successful completion of the AKA procedure 1202, the UE 802 may authenticate the serving network 804 using TAU messages. A TAU request 1210 may be employed, for example, during periodic registration or after a handover. According to certain aspects, the UE 802 may transmit the TAU request 1210 with additional fields that may include a Nonce, and a request for the signature of the MME 810. In some instances, the additional fields may also include a request for the public key of the MME 810. The MME 810 may transmit a response 1212 that is signed using its private key and, upon verification of the authenticity of the MME 810, the UE 802 may signal RRC connection setup complete 1214.

Figure 13:
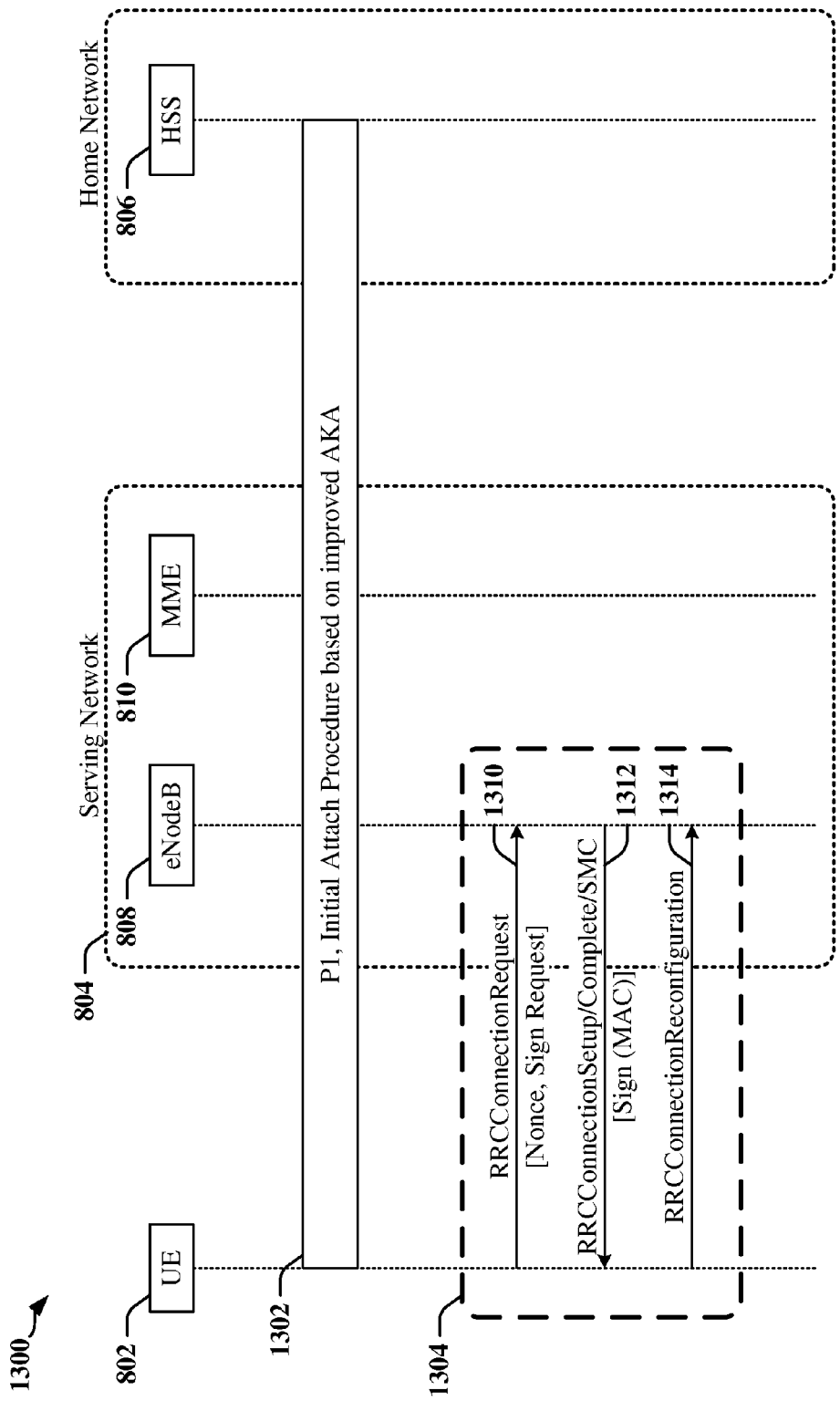
FIG. 13 is a message flow diagram illustrating a third example of connection request messages used for on-demand authentication of the serving network through an eNodeB in accordance with certain aspects disclosed herein.
Figure 14:
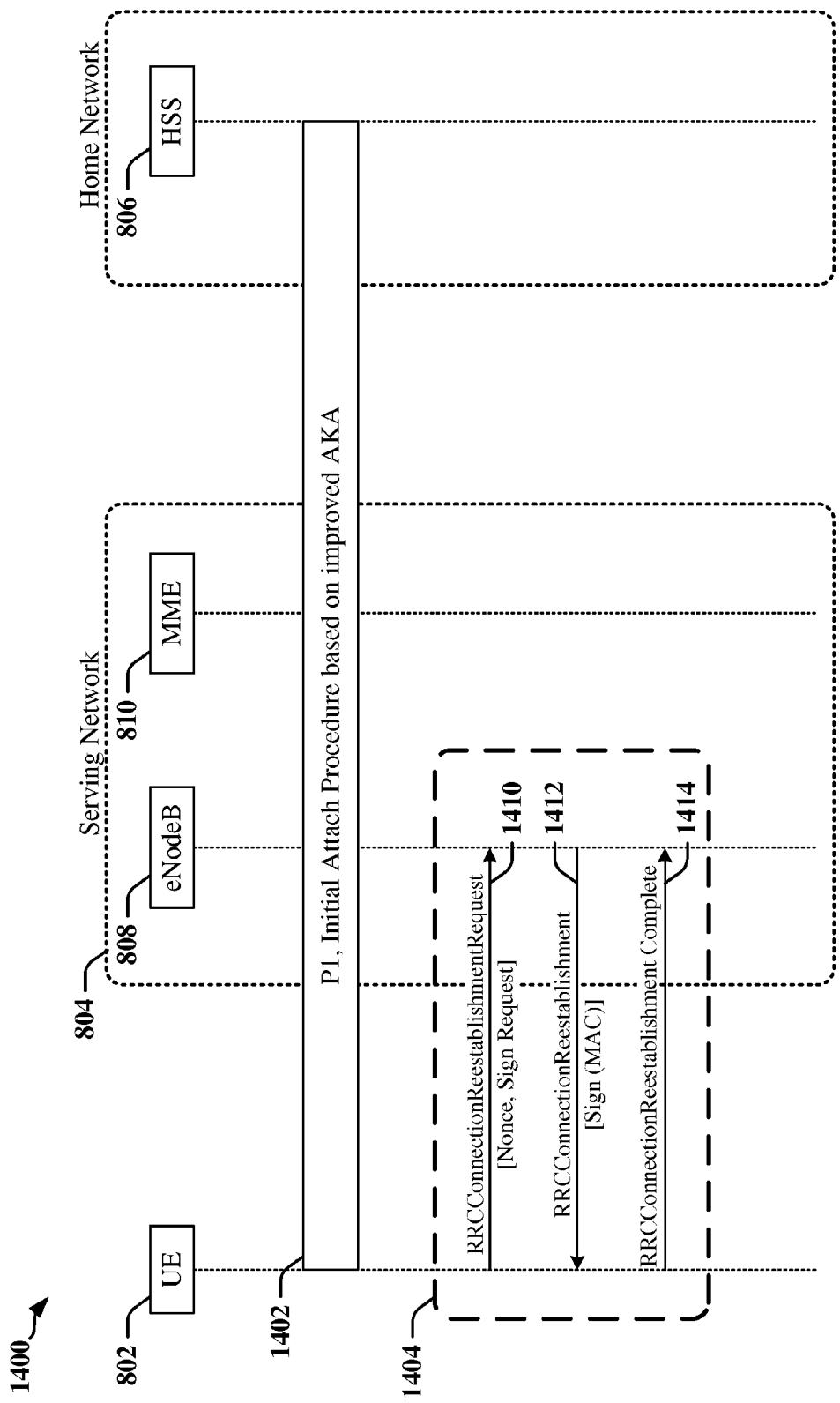
FIG. 14 is a message flow diagram illustrating a fourth example of connection request messages used for on-demand authentication of the serving network through an eNodeB in accordance with certain aspects disclosed herein.
Figure 15:
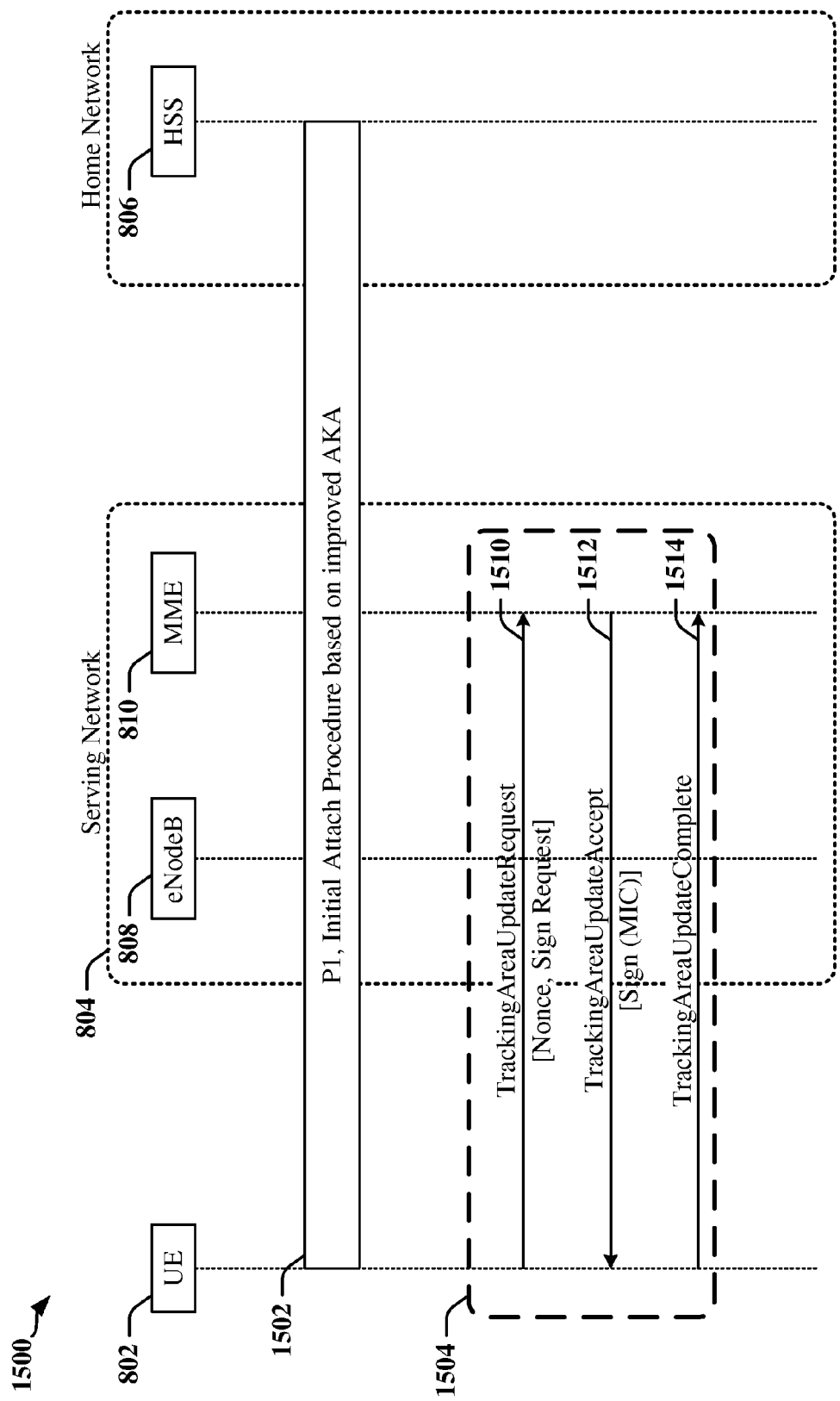
FIG. 15 is a message flow diagram illustrating a second example of TAU messages used for on-demand authentication of the serving network through an MME in accordance with certain aspects disclosed herein.

FIGS. 13, 14 and 15 are message flow diagrams 1300, 1400, 1500 that illustrate examples of on-demand processes for authenticating the serving network 804 using a shared-key based approach to thwart attacks in which an attacker may compromise and exploit system or protocol vulnerabilities in order to acquire session secrets, such as NAS keys and AS keys. Network functions such as the eNodeB 808 and MME 810 may be provisioned with a trusted execution environment, which may be used to maintain Key-Derivation-Keys for the network functions. An attacker typically cannot acquire the keys stored in the trusted execution environment. In one example, the Key-Derivation-Key stored in the trusted execution environment for the MME 810 is the $K_{ASME}$ key and the Key-Derivation-Key stored in the trusted execution environment for the eNodeB 808 is the $K_{eNB}$ key. The Key-Derivation-Keys are not directly used for encryption and integrity protection, and are typically used to generate keys that can be used for encryption and integrity protection. Network functions may prove their membership to the serving network 804 using their respective Key-Derivation-Keys. Attackers that do not have an access to Key-Derivation-Key stored in the trusted execution environment cannot prove impersonated membership to the serving network 804.

Certain on-demand processes for authenticating the serving network 804 using shared-keys may leverage messages initiated by the UE 802. The authentication process may be implemented as an on-demand process in order to limit baseline protocol overhead and to potentially eliminate idle state overhead.

RRC messages may be used to authenticate the eNodeB 808. Examples of such RRC messages include RRC connection request, and RRC connection reestablishment. The UE 802 may request that the connection messages exchanged with the eNodeB 808 be signed. In some instances, the eNodeB 808 may not be in possession of the KeNB when an RRC connection setup message is transmitted. Hence, the signature or a message authentication code (MAC) is sent to the UE 802 after the Security Mode Control procedure. A MAC code may include information produced using a hash function or the like, where the MAC code may authenticate and/or assure the integrity of a message.

TAU messages may be used to authenticate the MME 810. In one example, the UE 802 may request that TAU accept messages exchanged with the MME 810 be signed.

FIG. 13 is a message flow diagram 1300 that illustrates a third example in which RRC messages are used for on-demand authentication of the serving network 804 through the eNodeB 808. The UE 802 may initiate an AKA procedure 1302. Upon successful completion of the AKA procedure 1302, the UE 802 may authenticate the serving network 804 using the RRC messages 1304. An RRC connection request 1310 may be employed, for example, during transitions from idle mode. According to certain aspects, the UE 802 may transmit an RRC connection request 1310 that includes additional fields. The additional fields may include a Nonce and a signature request. The eNodeB 808 signs its response 1312 using KeNB and, upon verification of the authenticity of the eNodeB 808, the UE 802 may acknowledge completion of the procedure by signaling RRC connection setup complete 1314.

FIG. 14 is a message flow diagram 1400 that illustrates a fourth example of RRC messages 1404 used for on-demand authentication of the serving network 804 through the eNodeB 808. The UE 802 may initiate an AKA procedure 1402 and, upon successful completion of the AKA procedure 1402, the UE 802 may authenticate the serving network 804 using the RRC messages 1404. An RRC connection reestablishment request 1410 may be employed, for example, during connection failure recovery. According to certain aspects, the UE 802 may transmit an RRC connect reestablishment request 1410 that includes additional fields. The additional fields may include a Nonce and a signature request. The eNodeB 808 may transmit a response 1412 that is signed using KeNB and, upon verification of the authenticity of the eNodeB 808, the UE 802 may signal RRC connection setup complete 1414.

The UE 802 may authenticate the serving network 804 using RRC messages as needed when there is data to be transmitted, receives, or before or after a handover to another network function. RRC connection establishment, RRC connection, and/or RRC reestablishment requests are initiated by the UE 802 and such requests require a response from the eNodeB 808. In some instances, the UE 802 may determine that it is unnecessary to continually authenticate the serving network 804. For example, authentication need not be performed when the UE 802 is in an idle state and no handover is indicated. Overhead associated with the baseline protocol can be minimized when signatures are provided on-demand. The eNodeB 808 typically provides the network function certificate only upon request.

FIG. 15 is a message flow diagram 1500 that illustrates a second example of TAU messages 1504 used for on-demand authentication of the serving network through the MME 810. The UE 802 may initiate an AKA procedure 1502. Upon successful completion of the AKA procedure 1502, the UE 802 may authenticate the serving network 804 using the TAU messages 1504. A TAU request 1510 may be employed, for example, during periodic registration or after a handover. According to certain aspects, the UE 802 may transmit the TAU request 1510 with additional fields that may include a Nonce and a signature request. The MME 810 may transmit a response 1512 that is signed using the $K_{ASME}$ key and, upon verification of the authenticity of the MME 810, the UE 802 may signal RRC connection setup complete 1514.

Security Concerns Related to Physically Accessible Network Functions

Figure 16:
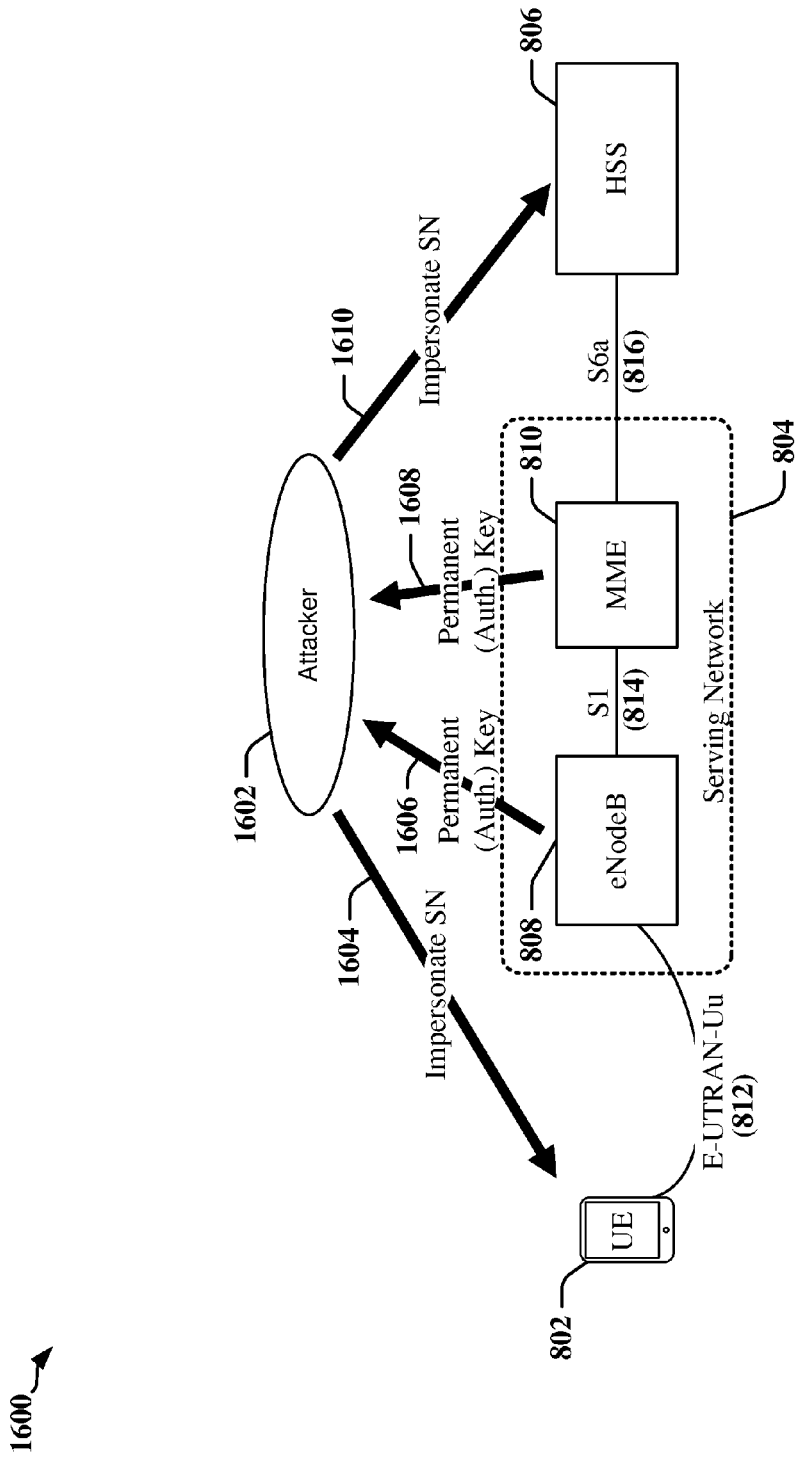
FIG. 16 is a diagram illustrating a second example of vulnerability in a wireless network.

FIG. 16 is a simplified block diagram 1600 illustrating certain vulnerabilities of the serving network 804 that may arise when an attacker 1602 has physical access to network equipment that provide certain network functions (e.g., the eNodeB 808 and/or the MME 810) of a serving network 804. Under this form of attack, the attacker 1602 may gain access to permanent credentials including permanent keys 1606, 1608 as well as session credentials. For example, the attacker 1602 may have access to a permanent key 1606, and/or 1608, such as the private key of network equipment and/or a network function such as the eNodeB 808 or the MME 810. The private key may be used to sign messages. Under this form of attack, the attacker 1602 can impersonate the serving network 804 persistently, with respect to communications 1604 with the UE 802 and with respect to communications 1610 with the HSS 806.

An attacker 1602 that has physical access to network equipment may be able to acquire all credentials issued for network functions by compromising network equipment associated with those network functions. The network functions may maintain, provide or be associated with credentials such as authentication vectors for a UE 802 and/or a private key bound to the certificate signed by the network operator.

Figure 17:
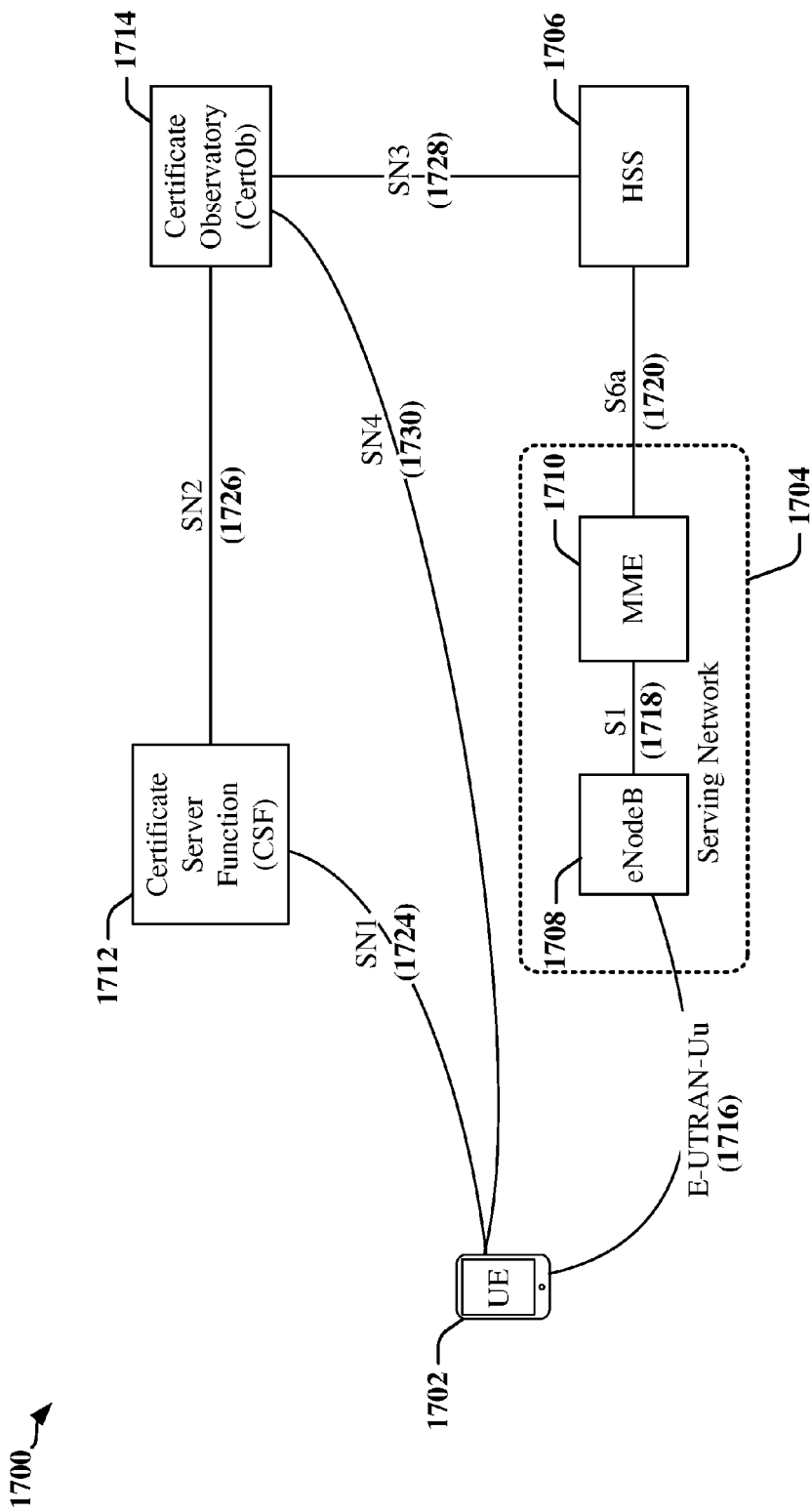
FIG. 17 is a diagram illustrating a wireless networking environment configured to overcome the vulnerabilities illustrated in FIG. 16 in accordance with certain aspects disclosed herein.

With reference to FIG. 17, security of a network may be enhanced when the network operator provisions network functions (e.g., the eNodeB 1708 and/or the MME 1710) with a public key certificate and employs the services of a certificate observatory (CertOb) 1714. The CertOb 1714 may be operated by a trusted third party that cannot be compromised. The CertOb 1714 may be used to prove the integrity of operator issued network function certificates. The CertOb 1714 may be identified and/or accessed using an identifier of the certificate observatory that includes an IP address and/or a universal resource locator (URL). The serving network may be authenticated using a public-key based authentication process, with verification of the certificate status of the network function (e.g., the eNodeB 1708 or the MME 1710).

A Certificate Server Function (CSF) 1712 manages network function certificates and provides the network function certificates to a UE 1702 on request. The CSF 1712 reports certificate status changes to the CertOb 1714. The status changes may include issuance events, revocation events, etc. The CertOb 1714 stores certificate integrity information of operators and provides the information to the HSS 1706 and to the UE 1702. The certificate integrity information may be provided as a hash of all current certificates for a serving network 1704. In one example, the hash may be provided as a Merkel hash tree, which provides an efficient and secure verification of the certificate associated with multiple domains corresponding to operator networks.

A UE 1702 may validate a certificate initially by comparing a first copy of the certificate integrity information provided by the serving network with a second copy of the certificate integrity information received at the UE 1702 from the CertOb 1714. If the first and second copies of the certificate integrity information do not match, the UE 1702 may request the CSF 1712 to provide one or more certificates for the serving network 1704 in order to authenticate a network function with which the UE 1702 is actively communicating.

Figure 18:
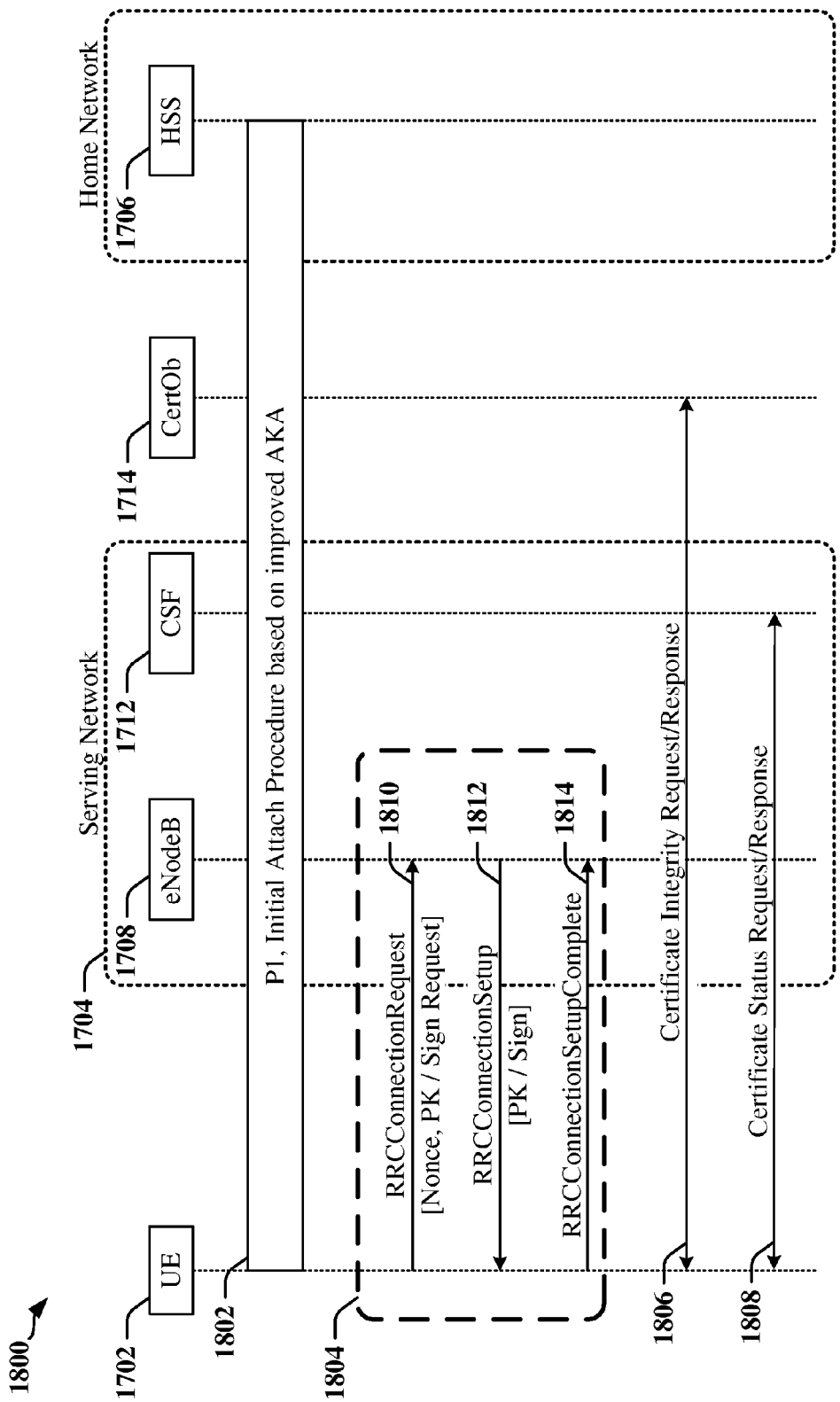
FIG. 18 is a message flow diagram illustrating a fifth example of connection request messages used for on-demand authentication of the serving network through an eNodeB in accordance with certain aspects disclosed herein.
Figure 19:
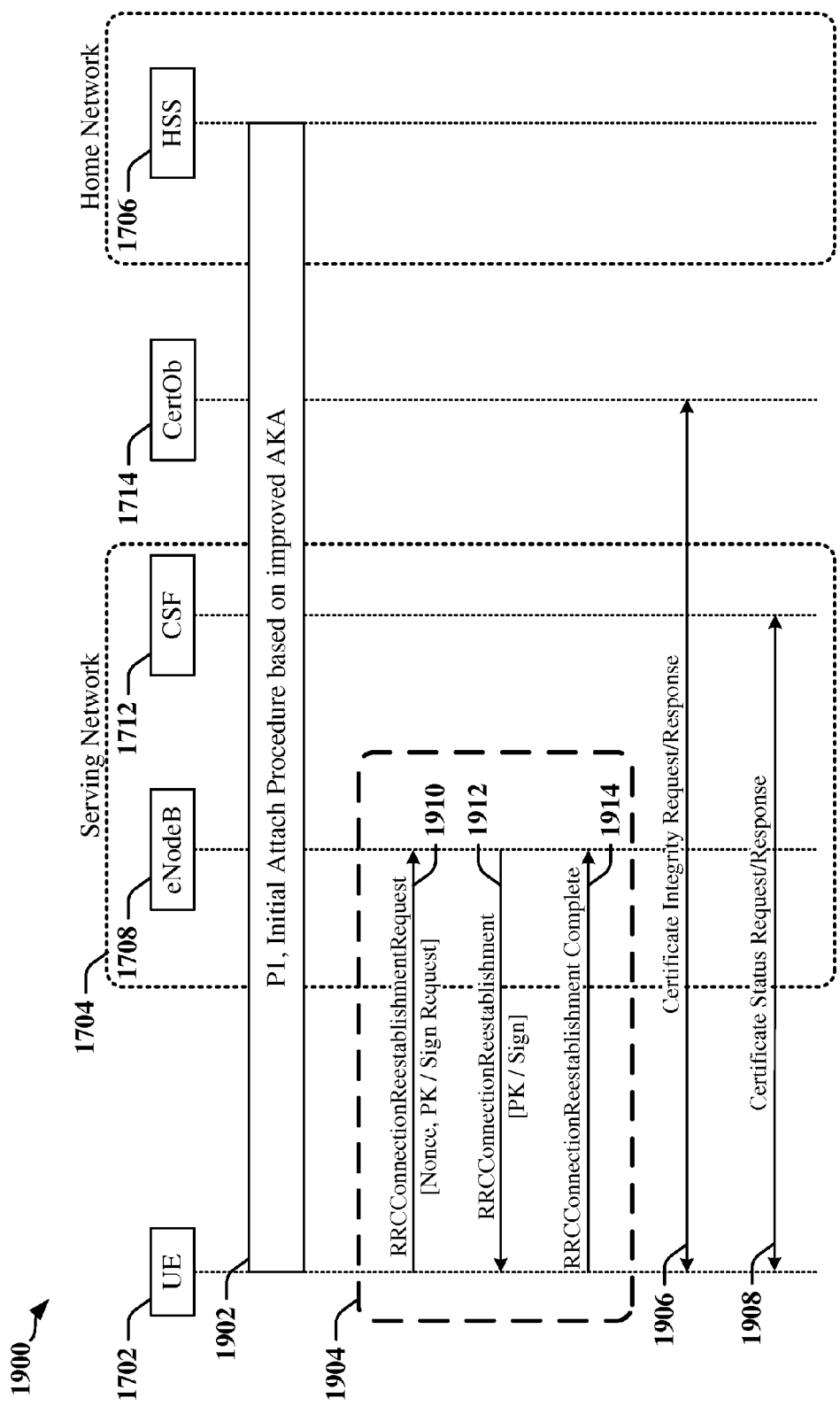
FIG. 19 is a message flow diagram illustrating a sixth example of connection request messages used for on-demand authentication of the serving network through an eNodeB in accordance with certain aspects disclosed herein.
Figure 20:
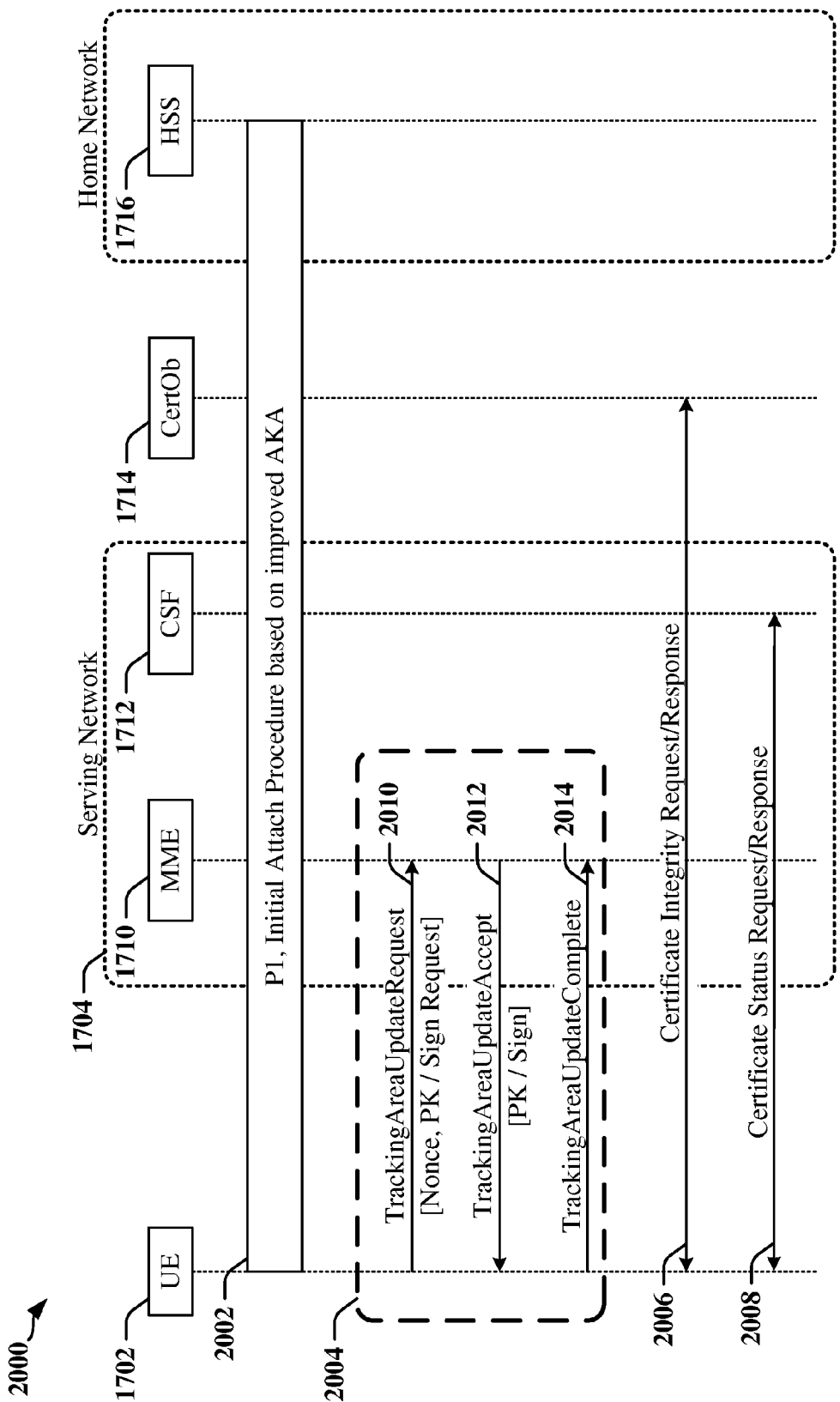
FIG. 20 is a message flow diagram illustrating a third example of TAU messages used for on-demand authentication of the serving network through an MME in accordance with certain aspects disclosed herein.

FIGS. 18, 19 and 20 are message flow diagrams 1800, 1900, 2000 that illustrate examples of on-demand processes for authenticating the serving network 1704 using an approach based on an operator-signed public key that is used to authenticate the serving network 1704. The serving network 1704 may be provisioned with a certificate signed by a trusted third party (TTP) such as Verisign or Internet Assigned Numbers Authority (TANA). In some instances, the serving network 1704 may employ a self-signed certificate that is provided to the UE 1702 in a list of trusted certification authorities (CAs) by the home network. The trusted CA list may include operators and their corresponding public keys. The CA list and public key or certificates may be distributed to roaming partners through a secure channel.

FIG. 18 is a message flow diagram 1800 that illustrates a fifth example of RRC messages 1804 used for on-demand authentication of the serving network 1704 through the eNodeB 1708. The UE 1702 may initiate an AKA procedure 1802. The UE 1702 may receive certificate integrity information of the serving network 1704 from the HSS 1706 during or after the AKA procedure 1802. Upon successful completion of the AKA procedure 1802, the UE 1702 may authenticate the serving network 1704 using the RRC messages 1804. An RRC connection request 1810 may be employed, for example, during transitions from idle mode. When a UE 1702 goes into idle mode, the eNodeB 1708 may drop the security context for UE 1702 for power-saving reasons. According to certain aspects, the UE 1702 may transmit an RRC connection request 1810 that includes additional fields. The additional fields may include a Nonce, and a request for the signature of the eNodeB 1708. In some instances, the additional fields may also include a request for the public key of the eNodeB 1708. The Nonce may be an arbitrary, random or pseudo-random number used to ensure that previous communications cannot be reused in replay attacks. The eNodeB 1708 may transmit a response 1812 that is signed using its private key and, upon verification of the authenticity of the eNodeB 1708, the UE 1702 may signal RRC connection setup complete 1814.

The UE 1702 may retrieve 1806 the current certificate integrity information of the serving network 1704 from the CertOb 1714. The UE 1702 may then verify that the current certificate integrity information is that same as the current certificate integrity information provided by the HSS 1706. If the current certificate integrity information of the serving network is different from the current certificate integrity information provided by the HSS 1706 during the initial attach, the UE 1702 verifies the network function certificate of the eNodeB 1708 by querying 1808 the CSF 1712, for example.

FIG. 19 is a message flow diagram 1900 that illustrates a sixth example of RRC messages 1904 used for on-demand authentication of the serving network 1704 through the eNodeB 1708. The UE 1702 may initiate an AKA procedure 1902. The UE 1702 may receive certificate integrity information of the serving network 1704 from the HSS 1706 during or after the AKA procedure 1802. Upon successful completion of the AKA procedure 1902, the UE 1702 may authenticate the serving network 1704 using the RRC messages 1904. An RRC connection reestablishment request 1910 may be employed, for example, during connection failure recovery. According to certain aspects, the UE 1702 may transmit an RRC connect reestablishment request 1910 that includes additional fields. The additional fields may include a Nonce, and a request for the signature of the eNodeB 1708. In some instances, the additional fields may also include a request for the public key of the eNodeB 1708. The eNodeB 1708 may transmit a response 1912 that is signed using its private key and, upon verification of the authenticity of the eNodeB 1708, the UE 1702 may signal RRC connection setup complete 1914.

The UE 1702 may retrieve 1906 the current certificate integrity information of the serving network 1704 from the CertOb 1714. The UE 1702 may then verify that the current certificate integrity information is that same as the current certificate integrity information provided by the HSS 1706. If the current certificate integrity information of the serving network is different from the current certificate integrity information provided by the HSS 1706 during the initial attach, the UE 1702 verifies the network function certificate of the eNodeB 1708 by querying 1908 the CSF 1712, for example.

The UE 1702 may authenticate the serving network 1704 using RRC messages as needed when there is data to be transmitted, receives, or before or after a handover to another network function. RRC connection/reestablishment requests are initiated by the UE 1702 and such requests require a response from the eNodeB 1708. In some instances, the UE 1702 may determine that it is unnecessary to continually authenticate the serving network 1704. For example, authentication need not be performed when the UE 1702 is in an idle state and no handover is indicated. Overhead associated with the baseline protocol can be minimized when signatures are provided on-demand. The eNodeB 1708 typically provides the network function certificate only upon request.

FIG. 20 is a message flow diagram 2000 that illustrates a third example of TAU messages 2004 used for on-demand authentication of the serving network through the MME 1710. The UE 1702 may initiate an AKA procedure 2002. The UE 1702 may receive certificate integrity information of the serving network 1704 from the HSS 1706 during or after the AKA procedure 2002. Upon successful completion of the AKA procedure 2002, the UE 1702 may authenticate the serving network 1704 using TAU messages. A TAU request 1210 may be employed, for example, during periodic registration or after a handover. According to certain aspects, the UE 1702 may transmit the TAU request 2010 with additional fields that may include a Nonce, and a request for the signature of the MME 1710. In some instances, the additional fields may also include a request for the public key of the MME 1710. The MME 1710 may transmit a response 2012 that is signed using its private key and, upon verification of the authenticity of the MME 1710, the UE 1702 may signal RRC connection setup complete 2014.

The UE 1702 may retrieve 2006 the current certificate integrity information of the serving network 1704 from the CertOb 1714. The UE 1702 may then verify that the current certificate integrity information is that same as the current certificate integrity information provided by the HSS 1706. If the current certificate integrity information of the serving network is different from the current certificate integrity information provided by the HSS 1706 during the initial attach, the UE 1702 verifies the network function certificate of the MME 1710 by querying 2008 the CSF 1712, for example.

Additional Descriptions of Certain Aspects

Figure 21:
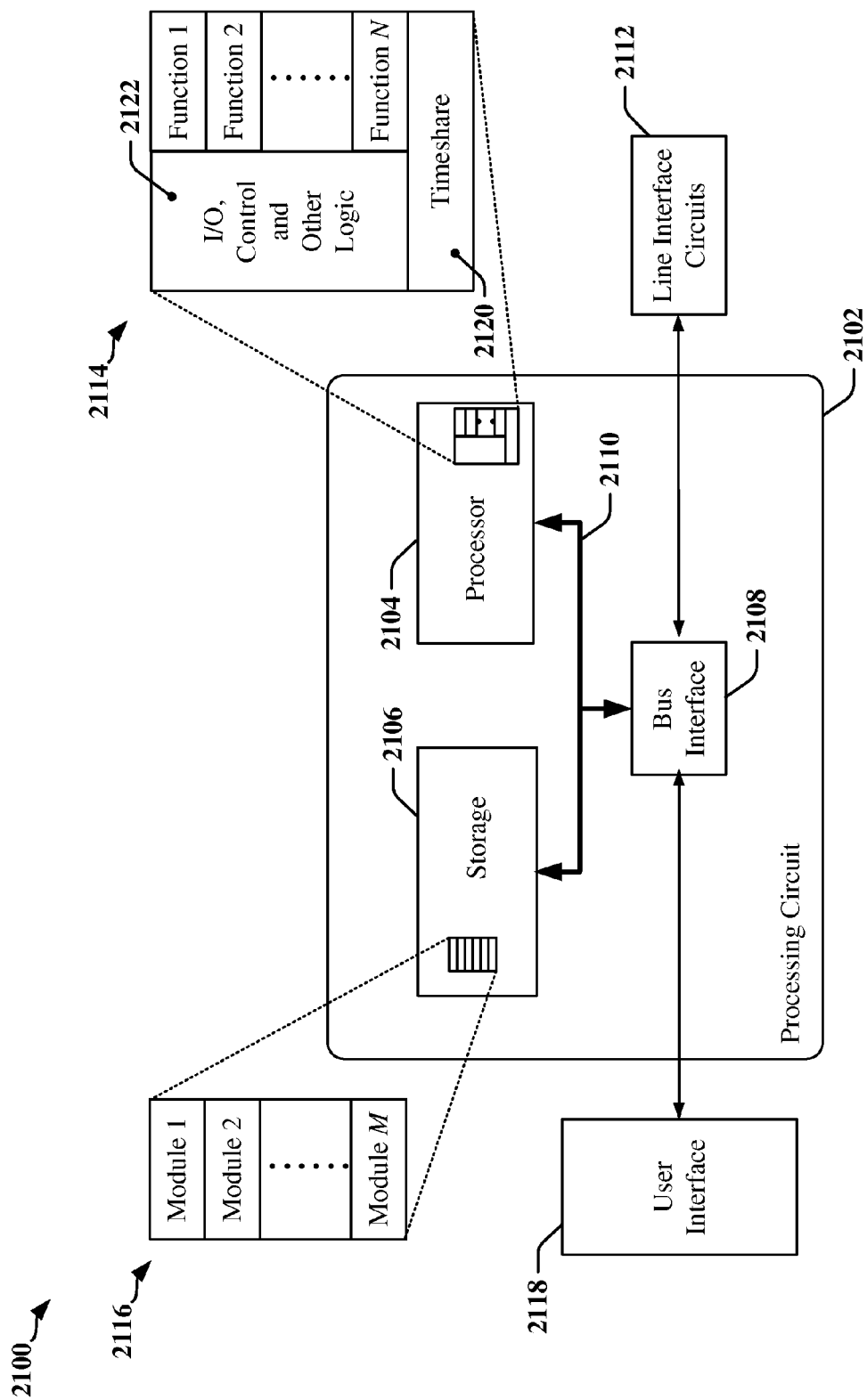
FIG. 21 is a block diagram illustrating an example of an apparatus employing a processing circuit that may be adapted according to certain aspects disclosed herein.

FIG. 21 is a conceptual diagram 2100 illustrating a simplified example of a hardware implementation for an apparatus employing a processing circuit 2102 that may be configured to perform one or more functions disclosed herein. In accordance with various aspects of the disclosure, an element, or any portion of an element, or any combination of elements as disclosed herein may be implemented using the processing circuit 2102. The processing circuit 2102 may include one or more processors 2104 that are controlled by some combination of hardware and software modules. Examples of processors 2104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2104 may include specialized processors that perform specific functions, and that may be configured, augmented or controlled by one of the software modules 2116. The one or more processors 2104 may be configured through a combination of software modules 2116 loaded during initialization, and further configured by loading or unloading one or more software modules 2116 during operation.

In the illustrated example, the processing circuit 2102 may be implemented with a bus architecture, represented generally by the bus 2110. The bus 2110 may include any number of interconnecting buses and bridges depending on the specific application of the processing circuit 2102 and the overall design constraints. The bus 2110 links together various circuits including the one or more processors 2104, and storage 2106. Storage 2106 may include memory devices and mass storage devices, and may be referred to herein as computer-readable media and/or processor-readable media. The bus 2110 may also link various other circuits such as timing sources, timers, peripherals, voltage regulators, and power management circuits. A bus interface 2108 may provide an interface between the bus 2110 and one or more transceivers 2112. A transceiver 2112 may be provided for each networking technology supported by the processing circuit. In some instances, multiple networking technologies may share some or all of the circuitry or processing modules found in a transceiver 2112. Each transceiver 2112 provides a means for communicating with various other apparatus over a transmission medium. Depending upon the nature of the apparatus, a user interface 2118 (e.g., keypad, display, speaker, microphone, joystick) may also be provided, and may be communicatively coupled to the bus 2110 directly or through the bus interface 2108.

A processor 2104 may be responsible for managing the bus 2110 and for general processing that may include the execution of software stored in a computer-readable medium that may include the storage 2106. In this respect, the processing circuit 2102, including the processor 2104, may be used to implement any of the methods, functions and techniques disclosed herein. The storage 2106 may be used for storing data that is manipulated by the processor 2104 when executing software, and the software may be configured to implement any one of the methods disclosed herein.

One or more processors 2104 in the processing circuit 2102 may execute software. The software may reside in computer-readable form in the storage 2106 or in an external computer readable medium. The external computer-readable medium and/or storage 2106 may include a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a "flash drive," a card, a stick, or a key drive), RAM, ROM, PROM, EPROM, EEPROM, a register, a removable disk, and any other suitable medium for storing software and/or instructions that may be accessed and read by a computer. The computer-readable medium and/or storage 2106 may also include, by way of example, a carrier wave, a transmission line, and any other suitable medium for transmitting software and/or instructions that may be accessed and read by a computer. Computer-readable medium and/or the storage 2106 may reside in the processing circuit 2102, in the processor 2104, external to the processing circuit 2102, or be distributed across multiple entities including the processing circuit 2102. The computer-readable medium and/or storage 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2106 may maintain software maintained and/or organized in loadable code segments, modules, applications, programs, etc., which may be referred to herein as software modules 2116. Each of the software modules 2116 may include instructions and data that, when installed or loaded on the processing circuit 2102 and executed by the one or more processors 2104, contribute to a run-time image 2114 that controls the operation of the one or more processors 2104. When executed, certain instructions may cause the processing circuit 2102 to perform functions in accordance with certain methods, algorithms and processes described herein.

Some of the software modules 2116 may be loaded during initialization of the processing circuit 2102, and these software modules 2116 may configure the processing circuit 2102 to enable performance of the various functions disclosed herein. For example, some software modules 2116 may configure internal devices and/or logic circuits 2122 of the processor 2104, and may manage access to external devices such as the transceiver 2112, the bus interface 2108, the user interface 2118, timers, mathematical coprocessors, and so on. The software modules 2116 may include a control program and/or an operating system that interacts with interrupt handlers and device drivers, and that controls access to various resources provided by the processing circuit 2102. The resources may include memory, processing time, access to the transceiver 2112, the user interface 2118, and so on.

One or more processors 2104 of the processing circuit 2102 may be multifunctional, whereby some of the software modules 2116 are loaded and configured to perform different functions or different instances of the same function. The one or more processors 2104 may additionally be adapted to manage background tasks initiated in response to inputs from the user interface 2118, the transceiver 2112, and device drivers, for example. To support the performance of multiple functions, the one or more processors 2104 may be configured to provide a multitasking environment, whereby each of a plurality of functions is implemented as a set of tasks serviced by the one or more processors 2104 as needed or desired. In one example, the multitasking environment may be implemented using a timesharing program 2120 that passes control of a processor 2104 between different tasks, whereby each task returns control of the one or more processors 2104 to the timesharing program 2120 upon completion of any outstanding operations and/or in response to an input such as an interrupt. When a task has control of the one or more processors 2104, the processing circuit is effectively specialized for the purposes addressed by the function associated with the controlling task. The timesharing program 2120 may include an operating system, a main loop that transfers control on a round-robin basis, a function that allocates control of the one or more processors 2104 in accordance with a prioritization of the functions, and/or an interrupt driven main loop that responds to external events by providing control of the one or more processors 2104 to a handling function.

The following flowcharts illustrate methods and processes performed or operative on network elements adapted or configured in accordance with certain aspects disclosed herein. The methods and processes may be implemented in any suitable network technology, including 3G, 4G, and 5G technologies, to name but a few. Accordingly, the claims are not restricted to a single network technology. In this regard, a reference to a "UE" may be understood to refer also to a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A reference to an "eNodeB" may be understood to refer to a base station, a base transceiver station, a radio base station, a radio transceiver, a transceiver function, a basic service set, an extended service set, or some other suitable terminology. A reference to an MME may refer also to an entity that serves as an authenticator in the serving network and/or a primary service delivery node such as a Mobile Switching Center, for example. A reference to the HSS may refer also to a database that contains user-related and subscriber-related information, provides support functions in mobility management, call and session setup, and/or user authentication and access authorization, including, for example, a Home Location Register (HLR), Authentication Centre (AuC) and/or an authentication, authorization, and accounting (AAA) server.

Figure 22:
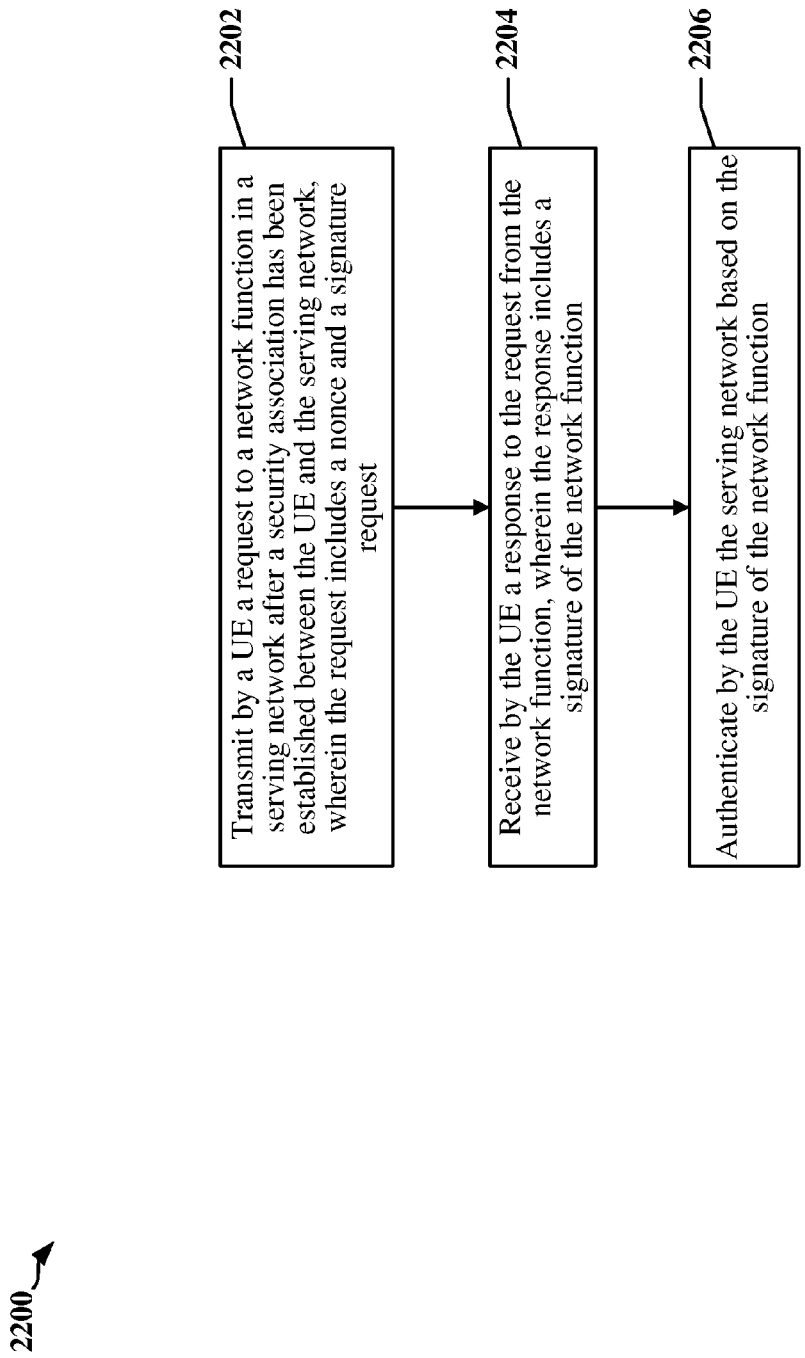
FIG. 22 is a flow chart of a method of wireless communication performed at a UE in accordance with certain aspects disclosed herein.

FIG. 22 is a flow chart 2200 of a method of securing wireless communication between a UE and a serving network.

At block 2202, the UE may transmit a connection request or tracking area request to a network function in a serving network after a security association has been established between the UE and the serving network. The request may include a nonce and a signature request. The request sent to the serving network may be sent while the UE is transitioning from an idle mode or after such transition from idle mode. In some instances, the request sent to the serving network may be an RRC message. The RRC message may be an RRC connection request, an RRC connection reestablishment request, and/or an RRC reconfiguration complete message. In some instances, the request sent to the serving network may be a TAU request.

At block 2204, the UE may receive a response to the connection request or tracking area request from the network function. The response may include a signature of the network function.

At block 2206, the UE may authenticate the serving network based on the signature of the network function and a public key certificate corresponding to the network function. The public key certificate may be signed using a private key of the serving network provided by a network operator associated with the serving network. The UE may maintain a list of trusted networks that identifies public keys or public key certificates corresponding to the trusted networks. The UE may authenticate the serving network by using the list of trusted networks to verify the public key of the network function and the signature generated by the network function. The serving network may be authenticated using a trusted third party to verify the public key certificate corresponding to the network function.

In some examples, a certificate integrity information request may be transmitted to the network, and first certificate integrity information received in a response from the network may be verified using second certificate integrity information received from a home subscriber server. The certificate integrity information request may include an identifier of a certificate observatory (such as the CertOb 1714 of FIG. 17) corresponding to the second certificate integrity information. The CertOb 1714 may be configured to maintain integrity of a set of certificates for a network. The identifier of the CertOb 1714 may be an IP address or URL. The first certificate integrity information may be verified by authenticating a response to the certificate integrity information request using a public key of the CertOb 1714. In some instances, the first certificate integrity information may be verified by comparing the first certificate integrity information with the second certificate integrity information, sending a certificate status request to a CSF 1712 when a difference is determined between the first certificate integrity information and the second certificate integrity information, and verifying status of a network function certificate based on a response from the CSF 1712. The certificate status request may include first identifying information that identifies the network function, second identifying information that identifies the network function certificate, and a version number of the network function certificate. A response from the CSF 1712 may include a certificate status response including status of the network function certificate, a public key of the network, and a signature of the certificate status response created by the CSF 1712 using a private key of the network. Verification of the certificate status response may be performed using the public key of the network.

Figure 23:
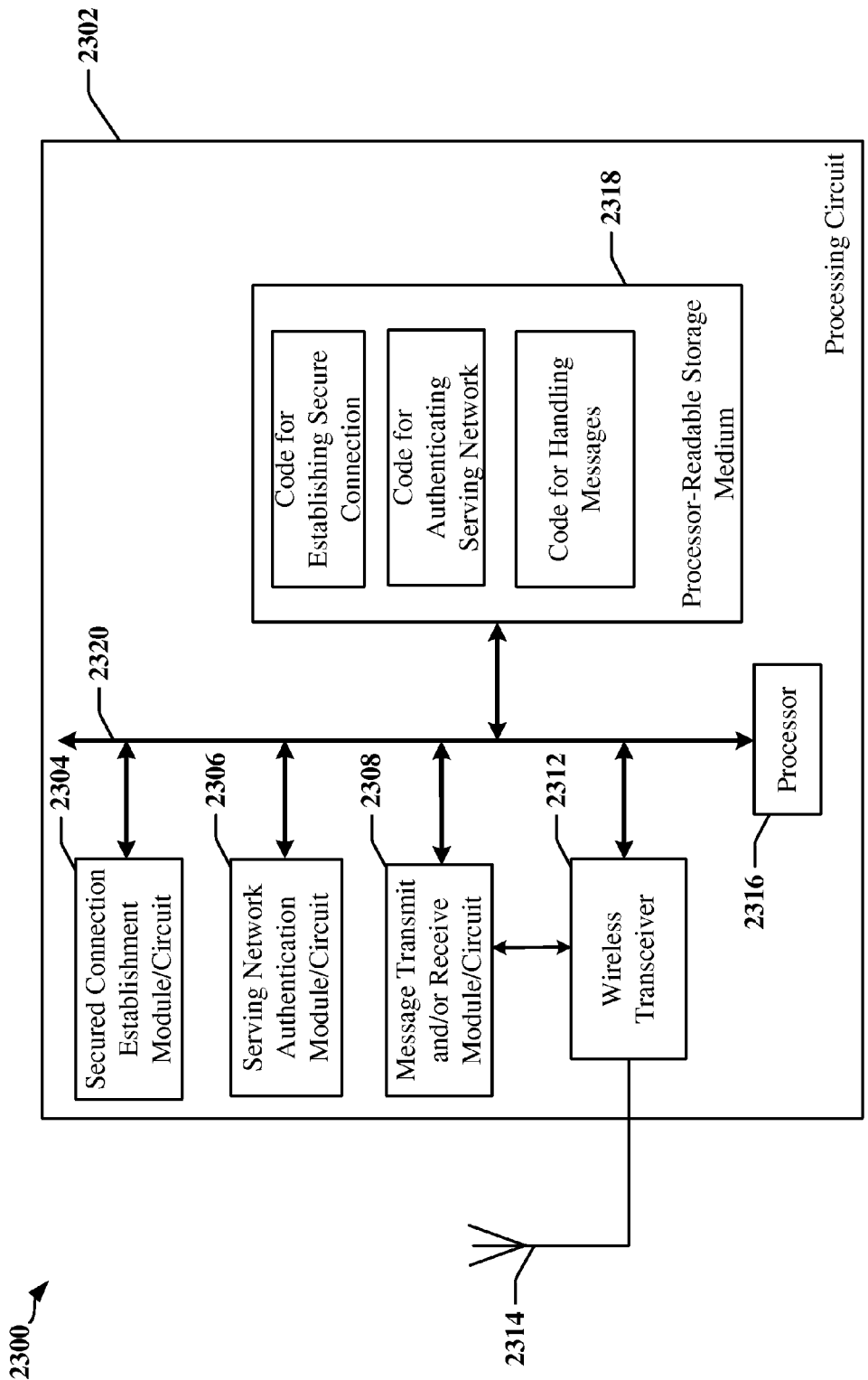
FIG. 23 illustrates a first example of a hardware implementation for an apparatus adapted according to one or more aspects disclosed herein.

FIG. 23 is a diagram illustrating a simplified example of a hardware implementation for an apparatus 2300 employing a processing circuit 2302. The processing circuit typically has a processor 2316 that may include one or more of a microprocessor, microcontroller, digital signal processor, a sequencer and a state machine. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the processor 2316, the modules or circuits 2304, 2306 and 2308, a wireless transceiver 2312 adapted to communicate through an antenna 2314 and the computer-readable storage medium 2318. The bus 2320 may also link various other circuits such as timing sources, peripherals, voltage regulators, and power management circuits, which are well known in the art, and therefore, will not be described any further.

The processor 2316 is responsible for general processing, including the execution of software stored on the computer-readable storage medium 2318. The software, when executed by the processor 2316, causes the processing circuit 2302 to perform the various functions described supra for any particular apparatus. The computer-readable storage medium 2318 may also be used for storing data that is manipulated by the processor 2316 when executing software, including data decoded from symbols transmitted over the antenna 2314, which may be configured as data lanes and clock lanes. The processing circuit 2302 further includes at least one of the modules 2304, 2306 and 2308. The modules 2304, 2306 and 2308 may be software modules running in the processor 2316, resident/stored in the computer-readable storage medium 2318, one or more hardware modules coupled to the processor 2316, or some combination thereof. The modules 2304, 2306 and/or 2308 may include microcontroller instructions, state machine configuration parameters, or some combination thereof.

In one configuration, the apparatus 2300 for wireless communication includes a module and/or circuit 2304 that is configured to authenticate and/or secure a connection with a home network, a module and/or circuit 2306 that is configured to authenticate a serving network, and a module and/or circuit 2308 that is configured to transmit and receive messages to the serving network.

In one example, the wireless transceiver 2312 may be configured to transmit messages to a wireless base station in the serving network, and to receive messages from the wireless base station. The module and/or circuit 2304 may include means for establishing a secured connection between the apparatus and a home network. The authenticated connection may be established responsive to a first authentication message transmitted through the wireless transceiver to the HSS. After the secured connection is established and before a second authentication request is transmitted to the HSS of the home network the modules and/or circuits 2308, 2312 may include means for transmitting a request to a network function in the serving network, the request having a nonce and a signature request attached thereto, and receive a response to the request from the network function, where the response includes a signature of the network function. The module and/or circuit 2306 may include means for authenticating the serving network based on the signature of the network function and a public key certificate corresponding to the network function and signed by a network operator. The public key certificate corresponding to the network function may be included in a list of trusted networks and their respective public key certificates maintained by the apparatus.

The modules and/or circuits 2308, 2312 may include means for transmitting a certificate integrity information request to the network, and module and/or circuit 2306 may include means for verifying first certificate integrity information received from the network using second certificate integrity information received from the HSS. The certificate integrity information request includes an identifier of a CertOb 1714 corresponding to the second certificate integrity information. The CertOb 1714 may be configured to maintain integrity of a set of certificates for a network.

The module and/or circuit 2306 may be configured to compare the first certificate integrity information with the second certificate integrity information, cause the modules and/or circuits 2308, 2312 to send a certificate status request to a CSF 1712 when a difference is determined between the first certificate integrity information and the second certificate integrity information, and verify status of a network function certificate based on a response from the CSF 1712. The certificate status request may include an identifier of the network function, an identifier of the network function certificate, and a version number of the network function certificate.

Figure 24:
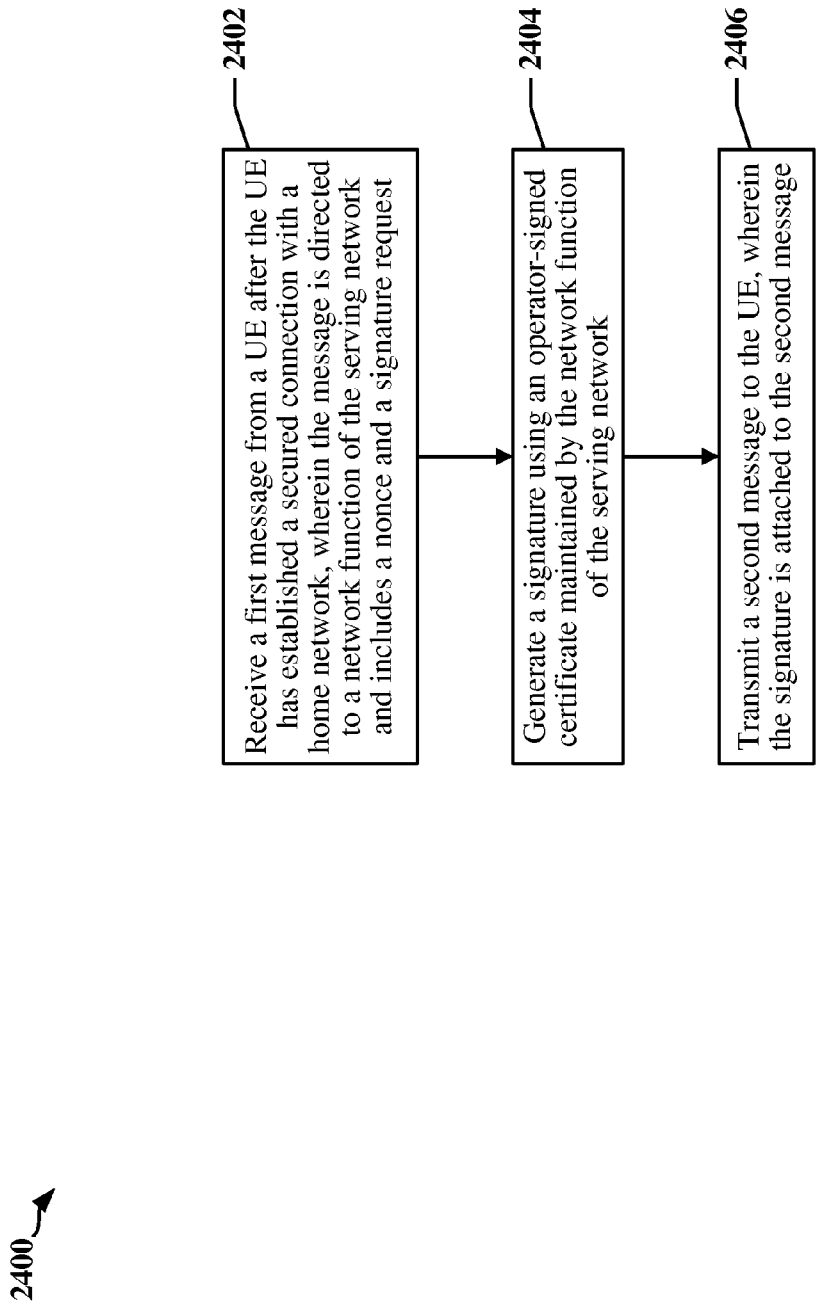
FIG. 24 is a flow chart of a method of wireless communication performed at a network node in accordance with certain aspects disclosed herein.

FIG. 24 is a flow chart 2400 of a method of proving membership of a serving network. The method may be performed by a network node (or network function) of a serving network.

At block 2202, the network node may receive a first message from UE after the UE has established a secured connection with a home network. The message may be directed to a network function of the serving network. The message may include a nonce and a signature request.

At block 2204, the network node may generate a signature using an operator-signed certificate maintained by the network function of the serving network. The operator-signed certificate may be a public key certificate signed by an operator of the serving network. A private key corresponding to the operator-signed certificate may be maintained in a secure storage or secure execution environment and/or in a trusted environment.

At block 2206, the network node may transmit a second message to the UE. The signature may be attached to the second message.

In some examples, the signature includes a MAC created using a session key shared between the UE and the network function. A symmetric cipher may be used for signing the second message response.

In some instances, the network node may be a MME and the session key may be a $K_{ASME}$. The MME may receive the $K_{ASME}$ from an HSS in a message encrypted using a public key of the MME, decrypt the $K_{ASME}$ using a private key stored in a trusted environment, and store the decrypted $K_{ASME}$ in the trusted environment. The authentication request may be received in a TAU request.

In some instances, the network node may be an eNodeB and the session key may be a KeNB. The eNodeB may receive the KeNB from an MME in a message encrypted using a public key of the eNodeB, decrypt the KeNB using a private key stored in a trusted environment, and store the decrypted KeNB in the trusted environment. The first message may be a radio resource control (RRC) message and the second message may be a response to the RRC message. For example, the RRC message may be an RRC connection establishment request, an RRC connection reestablishment request or an RRC reconfiguration complete message.

In some examples, the signature includes a digital signature created using a private key of the network node. An asymmetric cipher may be used for signing the authentication response. The private key of the network node may be stored in a trusted environment and the signature is created within the trusted environment.

Figure 25:
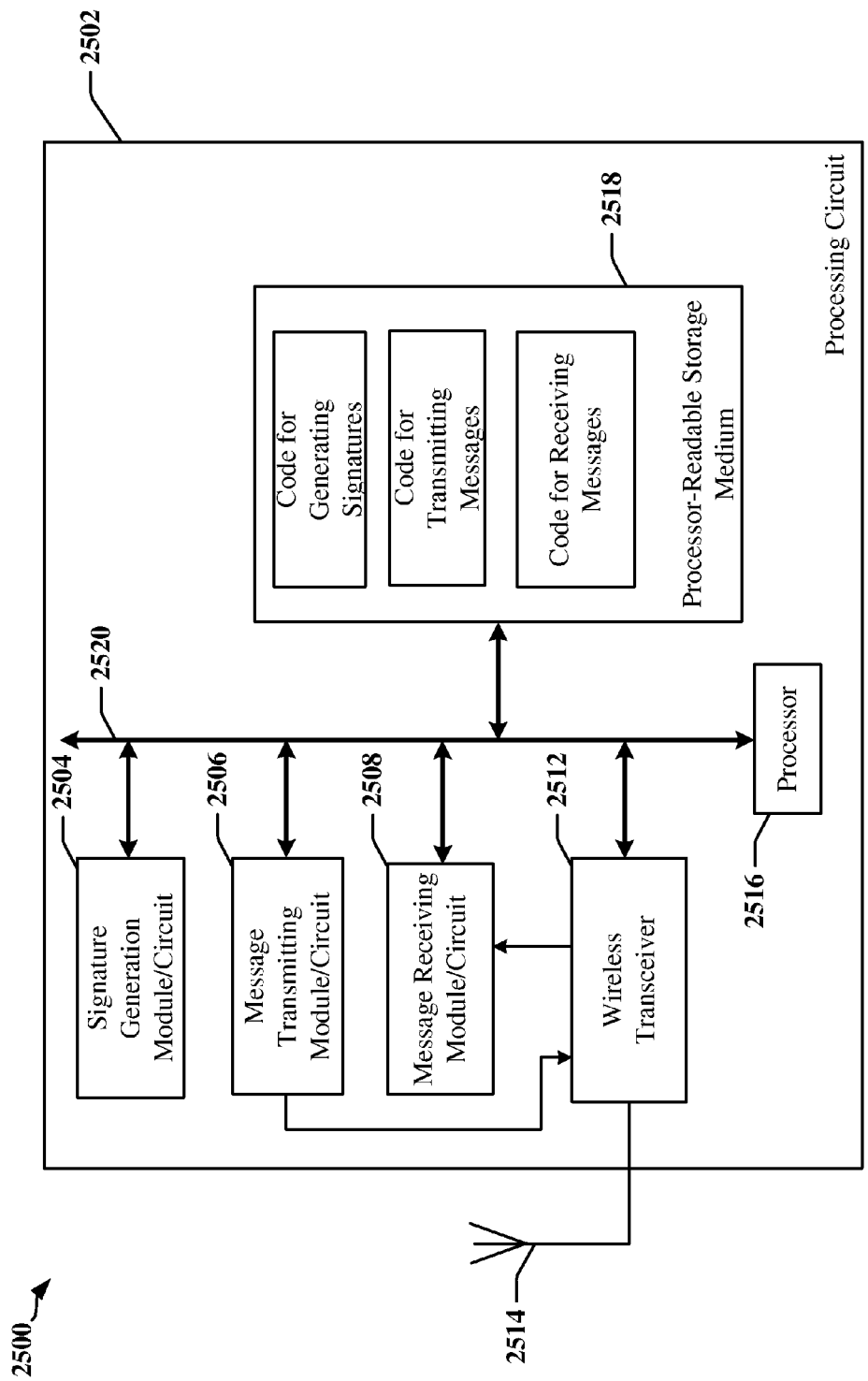
FIG. 25 illustrates a second example of a hardware implementation for an apparatus adapted according to one or more aspects disclosed herein.

FIG. 25 is a diagram illustrating a simplified example of a hardware implementation for an apparatus 2500 employing a processing circuit 2502. The processing circuit typically has a processor 2516 that may include one or more of a microprocessor, microcontroller, digital signal processor, a sequencer and a state machine. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the processor 2516, the modules or circuits 2504, 2506 and 2508, a wireless transceiver 2512 configurable to communicate through an antenna 2514 and the computer-readable storage medium 2518. The bus 2520 may also link various other circuits such as timing sources, peripherals, voltage regulators, and power management circuits, which are well known in the art, and therefore, will not be described any further.

The processor 2516 is responsible for general processing, including the execution of software stored on the computer-readable storage medium 2518. The software, when executed by the processor 2516, causes the processing circuit 2502 to perform the various functions described supra for any particular apparatus. The computer-readable storage medium 2518 may also be used for storing data that is manipulated by the processor 2516 when executing software, including data decoded from symbols transmitted over the antenna 2514, which may be configured as data lanes and clock lanes. The processing circuit 2502 further includes at least one of the modules 2504, 2506 and 2508. The modules 2504, 2506 and 2508 may be software modules running in the processor 2516, resident/stored in the computer-readable storage medium 2518, one or more hardware modules coupled to the processor 2516, or some combination thereof. The modules 2504, 2506 and/or 2508 may include microcontroller instructions, state machine configuration parameters, or some combination thereof.

In one configuration, the apparatus 2500 for wireless communication includes a module and/or circuit 2504 that is configured to generate authentication signatures, a module and/or circuit 2506 that is configured to transmit messages to a UE, and a module and/or circuit 2508 that is configured to receive messages from a UE.

In one example, the module and/or circuit 2508 may provide a means for receiving a first message from a UE after the UE has established a secured connection with a home network. The message may be directed to a network function of the serving network and includes a nonce and a signature request, the module and/or circuit 2504 may provide a means for generating a signature using an operator-signed certificate maintained by the network function of the serving network, and the module and/or circuit 2506 may provide a means for transmitting a second message to the UE, where the signature may be attached to the second message. The signature attached to the second message may be generated to prove to the UE that the apparatus 2500 is a member of a serving network. The operator-signed certificate may be a public key certificate signed by an operator of the serving network.

In some examples, the network node is an eNodeB, the first message is an RRC message and the second message is a response to the RRC message.

In some examples, the network node is an MME, and the authentication request is received in a TAU request.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of securing wireless communication between a user equipment (UE) and a serving network, comprising:
   initiating by the UE a security activation exchange between the UE and a home subscriber server to authenticate a serving network to the UE;
   transmitting by the UE a request to a network function in the serving network after the serving network has been authenticated, wherein the request includes a nonce and a signature request;
   receiving by the UE a response to the request from the network function, wherein the response includes a signature of the network function generated using a key maintained in a trusted environment in the network function of the serving network, and wherein the trusted environment is inaccessible to entities external to the network function and thereby prevents an attacker from acquiring the key; and
   verifying authenticity of the serving network by the UE based on the signature of the network function and a credential provided in a list of trusted networks maintained by the UE.

2. The method of claim 1, wherein the signature is created using a public key certificate corresponding to the network function, and wherein the public key certificate is signed using a private key of the serving network provided by a network operator associated with the serving network.

3. The method of claim 2, wherein re-authenticating the serving network comprises:
   using a trusted third party to verify the public key certificate corresponding to the network function.

4. The method of claim 1, wherein the signature is created using a key that is shared between the UE and the network function.

5. The method of claim 1, wherein:
   the list of trusted networks maintained by the UE identifies public keys or public key certificates corresponding to the trusted networks, and
   re-authenticating the serving network includes verifying by the UE the public key of the network function and the signature generated by the network function using the list of trusted networks.

6. The method of claim 1, wherein the request sent to the serving network comprises a radio resource control message (RRC message).

7. The method of claim 6, wherein the RRC message includes an RRC connection request, an RRC connection reestablishment request, or an RRC reconfiguration complete message.

8. The method of claim 6, wherein the RRC message is sent during a transition from idle mode.

9. The method of claim 1, wherein the request sent to the serving network comprises a tracking area update (TAU) request.

10. The method of claim 1, further comprising:
    transmitting a certificate integrity information request to the serving network; and
    verifying first certificate integrity information received from the serving network using second certificate integrity information received from a home subscriber server,
    wherein the certificate integrity information request includes an identifier of a certificate observatory corresponding to the second certificate integrity information, and
    wherein the certificate observatory is configured to maintain integrity of a set of certificates for one or more networks.

11. The method of claim 10, wherein the identifier of the certificate observatory includes an Internet Protocol (IP) address or a universal resource locator (URL).

12. The method of claim 10, wherein verifying first certificate integrity information comprises:
authenticating a response to the certificate integrity information request using a public key of the certificate observatory.

13. The method of claim 10, wherein verifying first certificate integrity information comprises:
comparing the first certificate integrity information with the second certificate integrity information;
sending a certificate status request to a Certificate Server Function (CSF) when a difference is determined between the first certificate integrity information and the second certificate integrity information; and
verifying status of a network function certificate based on a response from the CSF,
wherein the certificate status request includes first identifying information that identifies the network function, second identifying information that identifies the network function certificate, and a version number of the network function certificate, and
wherein a response from the CSF comprises a certificate status response including status of the network function certificate, a public key of the network, and a signature of the certificate status response created by the CSF using a private key of the network, and wherein verification of the certificate status response is performed using the public key of the network.

14. An apparatus comprising:
a wireless transceiver; and
a processor coupled to the transceiver, the processor configured to:
initiate a security activation exchange between the apparatus and a home subscriber server in order to authenticate a serving network to the apparatus;
transmit a request to a network function in a serving network after the serving network has been authenticated, wherein the request includes a nonce and a signature request;
receive a response to the request from the network function, wherein the response includes a signature of the network function generated using a key maintained in a trusted environment in the network function of the serving network, and wherein the trusted environment is inaccessible to entities external to the network function and thereby prevents an attacker from acquiring the key; and
verify authenticity of the serving network based on the signature of the network function and a credential provided in a list of trusted networks maintained by the apparatus.

15. The apparatus of claim 14, wherein the request comprises a radio resource control connection request or a tracking area request, and wherein the processor is configured to:
transmit the radio resource control connection request or tracking area request to the network function in the serving network while the apparatus is transitioning from an idle mode.

16. The apparatus of claim 14, wherein the signature is created using a key that is shared between the UE and the network function, or using a public key certificate signed using a private key of the serving network provided by a network operator associated with the serving network.

17. The apparatus of claim 14, wherein the processor is configured to:
transmit a certificate integrity information request to the serving network;
verify first certificate integrity information received from the serving network based on second certificate integrity information received from a Home Subscriber Server when no difference is determined between the first certificate integrity information and the second certificate integrity information;
send a certificate status request to a Certificate Server Function (CSF) when a difference is determined between the first certificate integrity information and the second certificate integrity information; and
verify status of a network function certificate based on a response from the CSF,
wherein the certificate integrity information request includes an identifier of a certificate observatory corresponding to the second certificate integrity information, and
wherein the certificate observatory is configured to maintain integrity of a set of certificates for one or more networks, and
wherein the certificate status request includes an identifier of the network function, an identifier of the network function certificate, and a version number of the network function certificate.

18. A method of proving membership of a serving network, comprising:
receiving a first message from a user equipment (UE) after the UE has authenticated the serving network through a secured connection with a home network, wherein the first message is directed to a network function of the serving network and includes a nonce and a signature request;
generating a signature using an operator-signed certificate maintained in a trusted environment in the network function of the serving network, wherein the trusted environment is inaccessible to entities external to the network function and thereby prevents an attacker from acquiring the operator-signed certificate; and
transmitting a second message to the UE, wherein the signature is attached to the second message, wherein the UE is configured to use the signature to verify authenticity of the serving network based on a list of trusted networks maintained by the UE.

19. The method of claim 18, wherein the operator-signed certificate is a public key certificate signed by an operator of the serving network.

20. The method of claim 18, wherein a private key corresponding to the operator-signed certificate is maintained in a secure storage or a secure execution environment.

21. The method of claim 18, wherein a private key corresponding to the operator-signed certificate is maintained in a trusted environment.

22. The method of claim 18, wherein the signature comprises a message authentication code (MAC) created using a session key shared between the UE and the network function, and wherein a symmetric cipher is used for signing the second message.

23. The method of claim 22, wherein the network function comprises a Mobility Management Entity (MME) and the session key comprises an access security management entity key ($K_{ASME}$), and further comprising:
receiving the $K_{ASME}$ from a Home Subscriber Server (HSS) in a message encrypted using a public key of the MME;

decrypting the $K_{ASME}$ using a private key stored in a trusted environment; and storing the $K_{ASME}$ in the trusted environment.

24. The method of claim 22, wherein the network function comprises an eNodeB and the session key comprises a KeNB, and further comprising:

receiving the KeNB from an MME in a message encrypted using a public key of the eNodeB;

decrypting the KeNB using a private key stored in a trusted environment; and storing the KeNB in the trusted environment.

25. The method of claim 18, wherein the signature comprises a digital signature created using a private key of the network function, wherein an asymmetric cipher is used for signing the second message, and wherein the private key of the network function is stored in a trusted environment and the signature is created within the trusted environment.

26. The method of claim 18, wherein the network function comprises an eNodeB, and wherein the first message comprises a radio resource control message (RRC message) and the second message comprises a response to the RRC message.

27. The method of claim 26, wherein the RRC message is an RRC connection establishment request, an RRC connection reestablishment request or an RRC reconfiguration complete message.

28. The method of claim 18, wherein the network function comprises an MME, and wherein the first message comprises a tracking area update (TAU) request.

29. An apparatus comprising:

means for receiving a first message from a user equipment (UE) after the UE has authenticated the serving network through a secured connection with a home network, wherein the first message is directed to a network function of a serving network and includes a nonce and a signature request;

means for generating a signature using an operator-signed certificate maintained in a trusted environment in the network function of the serving network, wherein the trusted environment is inaccessible to entities external to the network function and thereby prevents an attacker from acquiring the operator-signed certificate; and means for transmitting a second message to the UE, wherein the signature is attached to the second message, wherein the signature attached to the second message is generated to prove to the UE that the apparatus is a member of the serving network, wherein the operator-signed certificate is a public key certificate signed by an operator of the serving network, and wherein the UE is configured to use the signature to verify authenticity of the serving network based on a list of trusted networks maintained by the UE.

30. The apparatus of claim 29, wherein:

the first message comprises a radio resource control (RRC) message and the second message comprises a response to the RRC message when the network function comprises an eNodeB; and the first message comprises a tracking area update (TAU) request when the network function comprises a Mobility Management Entity (MME).

* * * * *